US012109695B2

(12) United States Patent
Malzahn et al.

(10) Patent No.: US 12,109,695 B2
(45) Date of Patent: Oct. 8, 2024

(54) MODULAR CONFIGURABLE ROBOT, CORRESPONDING METHOD AND COMPUTER PROGRAM PRODUCT

(71) Applicants: FONDAZIONE ISTITUTO ITALIANO DI TECNOLOGIA, Genoa (IT); UNIVERSITÀ DEGLI STUDI DI GENOVA, Genoa (IT)

(72) Inventors: Jörn Malzahn, Genoa (IT); Navvab Kashiri, Genoa (IT); Edoardo Romiti, Filottrano (IT); Lorenzo Baccelliere, Genoa (IT); Stefano Cordasco, Genoa (IT); Arturo Laurenzi, Genoa (IT); Alessio Margan, Genoa (IT); Enrico Mingo Hoffman, Genoa (IT); Luca Muratore, Rapallo (IT); Nikolaos Tsagarakis, Genoa (IT)

(73) Assignees: FONDAZIONE ISTITUTO ITALIANO DI TECNOLOGIA, Genoa (IT); UNIVERSITÀ DEGLI STUDI DI GENOVA, Genoa (IT)

( * ) Notice: Subject to any disclaimer, the term of this patent is extended or adjusted under 35 U.S.C. 154(b) by 262 days.

(21) Appl. No.: 17/787,819

(22) PCT Filed: Dec. 17, 2020

(86) PCT No.: PCT/EP2020/086880
§ 371 (c)(1),
(2) Date: Jun. 21, 2022

(87) PCT Pub. No.: WO2021/123057
PCT Pub. Date: Jun. 24, 2021

(65) Prior Publication Data
US 2023/0028405 A1    Jan. 26, 2023

(30) Foreign Application Priority Data
Dec. 18, 2019   (IT) .................. 102019000024481

(51) Int. Cl.
*B25J 9/08* (2006.01)
*B25J 9/16* (2006.01)
*B25J 19/00* (2006.01)

(52) U.S. Cl.
CPC ................. *B25J 9/08* (2013.01); *B25J 9/161* (2013.01); *B25J 9/1617* (2013.01); *B25J 19/0033* (2013.01)

(58) Field of Classification Search
CPC ... B25J 9/08; B25J 9/161; B25J 9/1617; B25J 19/0033; G05B 19/4141;
(Continued)

(56) References Cited

U.S. PATENT DOCUMENTS 5,523,662 A * 6/1996 Goldenberg ........... B25J 17/025
901/23
6,084,373 A * 7/2000 Goldenberg ............... B25J 9/08
901/23
(Continued)

FOREIGN PATENT DOCUMENTS

EP       3 476 548       5/2019

OTHER PUBLICATIONS

International Search Report and Written Opinion of the ISA for PCT/EP2020/086880, mailed Mar. 23, 2021, 14 pages.
(Continued)

*Primary Examiner* — Jaime Figueroa
(74) *Attorney, Agent, or Firm* — Nixon & Vanderhye P.C.

(57) ABSTRACT

A modular configurable robot, comprising robot modules comprising a coupling mechanism including an electrical coupling member comprising a network communication signal connection, an arrangement forming upon coupling an orientation signal, an integrated circuit comprising a microcontroller circuit with unique identification code and I/O ports coupled to said electrical coupling to receive
(Continued)

orientation electrical signal, a communication slave module comprising ports and registers storing state values of the ports, one port pre-designated as input, the ports being open or closed depending on the port state, the robot comprising a master communication module forming with said slave modules a master slave communication network topology, a server hosting a database of robot module parameters, accessible by unique identification code, said master module retrieving from said communication slave module the unique identification code, and from the database robot module parameters, and from said microcontroller circuit said information of a relative orientation.

13 Claims, 15 Drawing Sheets

(58) Field of Classification Search
CPC .......... G05B 2219/39197; G05B 2219/39346; G05B 2219/40336; G05B 2219/40338; G05B 2219/40367
USPC ................ 700/245–264; 318/568.11–568.25
See application file for complete search history.

(56) References Cited

U.S. PATENT DOCUMENTS

| | | | | |
|---|---|---|---|---|
| 6,323,615 B1* | 11/2001 | Khairallah | ............. | B25J 18/025 318/587 |
| 6,353,774 B1* | 3/2002 | Goldenberg | ....... | G01N 35/0099 29/431 |
| 6,459,957 B1* | 10/2002 | Bennett, III | ........... | G06N 3/002 714/766 |
| 6,477,444 B1* | 11/2002 | Bennett, III | ........... | G06N 3/126 702/182 |
| 6,603,281 B2* | 8/2003 | Yim | ....................... | B25J 9/1625 318/560 |
| 6,636,781 B1* | 10/2003 | Shen | ........................ | B25J 9/065 703/2 |
| 6,686,717 B2* | 2/2004 | Khairallah | ................. | B25J 9/08 901/1 |
| 6,842,246 B2* | 1/2005 | Roufas | .................... | G01B 11/00 356/399 |
| 9,358,687 B2* | 6/2016 | Emami | ....................... | B25J 9/08 |
| 9,475,199 B2 | 10/2016 | Burridge et al. | | |
| 9,561,590 B1* | 2/2017 | Nusser | .................... | B25J 9/1661 |
| 9,737,986 B2* | 8/2017 | Hardouin | ................. | B25J 5/007 |
| 9,981,376 B2* | 5/2018 | Hardouin | ................. | B25J 5/007 |
| 10,482,786 B2* | 11/2019 | Ryland | ....................... | B25J 9/08 |
| 10,857,669 B2* | 12/2020 | Rus | ........................ | A63H 29/20 |
| 2002/0043950 A1* | 4/2002 | Yim | ............................ | B25J 9/08 318/560 |
| 2002/0053893 A1* | 5/2002 | Khairallah | ................. | B25J 9/08 318/568.1 |
| 2002/0152006 A1* | 10/2002 | Bennett, III | ........... | G06N 3/002 700/245 |
| 2003/0038607 A1* | 2/2003 | Yim | ........................... | B25J 9/08 318/568.11 |
| 2003/0109958 A1* | 6/2003 | Hogg | ..................... | G06N 3/008 700/245 |
| 2014/0222198 A1* | 8/2014 | Emami | ...................... | B25J 9/08 901/14 |
| 2015/0258682 A1* | 9/2015 | Izikevich | ................. | B25J 9/104 74/490.01 |
| 2016/0005331 A1* | 1/2016 | Ryland | ...................... | F16H 1/12 434/118 |
| 2016/0214664 A1* | 7/2016 | Domholt | .............. | B62D 55/244 |
| 2017/0282089 A1 | 10/2017 | Wang et al. | | |
| 2021/0387341 A1* | 12/2021 | Liu | ........................ | B25J 9/1617 |

OTHER PUBLICATIONS

Paredis et al., "A Rapidly Deployable Manipulator System", Proceedings of the 1996 International Conference on Robotics and Automation, IEEE, Apr. 22-28, 1996; vol. CONF. 13, Apr. 22, 1996, pp. 1434-1439.

\* cited by examiner

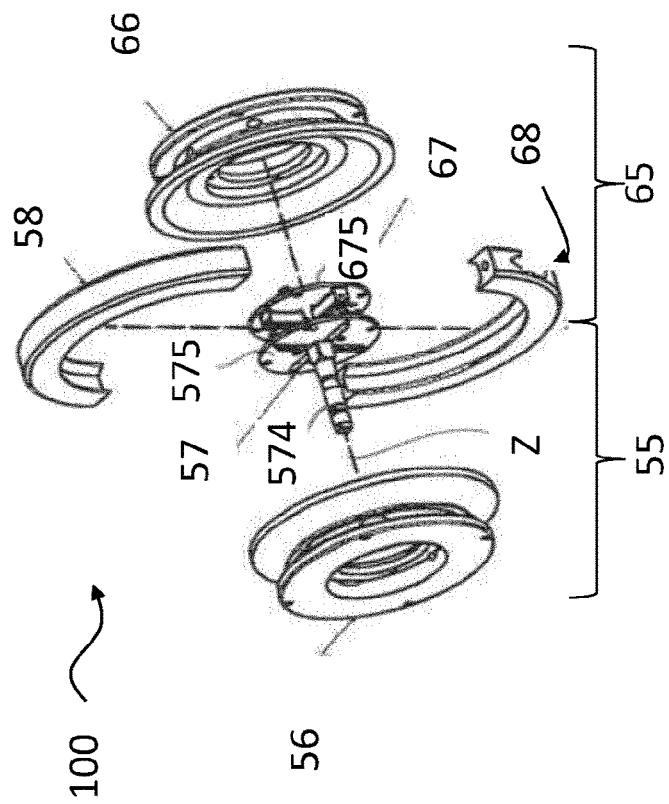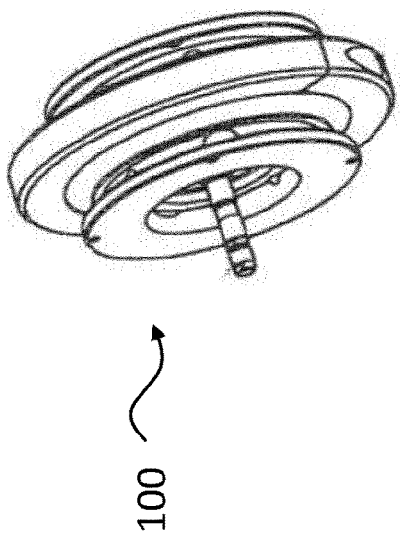
Fig. 6B
Fig. 6A

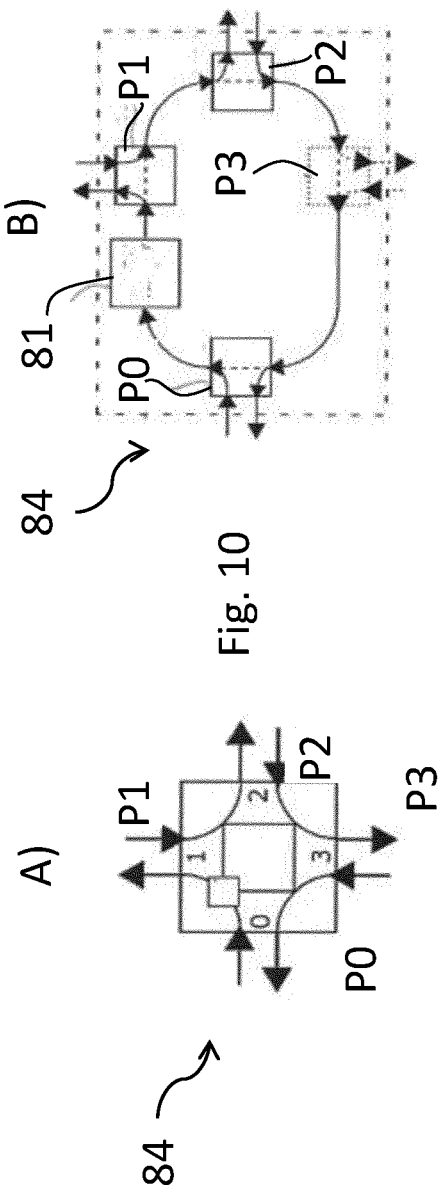
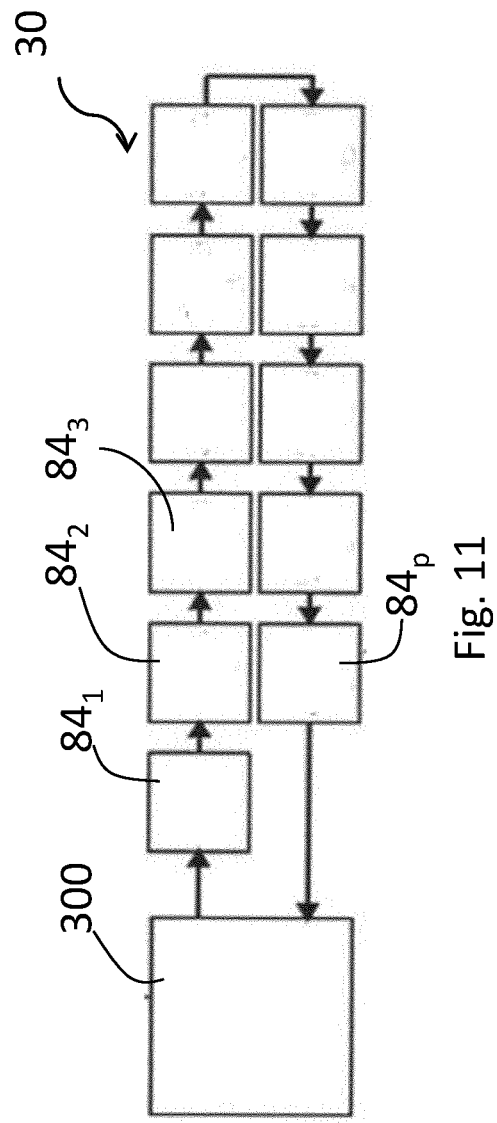
Fig. 10
Fig. 11

MODULAR CONFIGURABLE ROBOT, CORRESPONDING METHOD AND COMPUTER PROGRAM PRODUCT

This application is the U.S. national phase of International Application No. PCT/EP2020/086880 filed Dec. 17, 2020, which designated the U.S. and claims priority to IT patent application No. 102019000024481 filed Dec. 18, 2019, the entire contents of each of which are hereby incorporated by reference.

TECHNICAL FIELD

The description relates to a (re)configurable or modular robotic system.

One or more embodiments may facilitate human-robot interaction thanks to adaptive robot configuration.

TECHNOLOGICAL BACKGROUND

A robot is a machine capable of processing a part of functions of a human or performing certain works by itself.

In the existing technique, a robot is fabricated so that a body performing computational processing and a driving unit having a motor or an actuator are integrated. If the body and the driving unit are not integrally fabricated, the body and the driving unit are generally coupled by means of a coupling member such as bolts or screws so as not to be easily dissembled.

Many automation tasks, for instance in manufacturing, agriculture, inspection and maintenance applications, may be difficult to automate using existing robotic systems because task definitions may vary so frequently that it may be hard to find a single robot to fit all tasks, for instance due to underlying complexity and dynamic of the process or environment or simply due to small batch sizes of tasks.

Purchasing multiple different robots to cover an ample number of potential scenarios may be economically infeasible, especially for small and medium sized enterprises.

Robotic automation may face many maintenance intervals, during which it may be completely halted and temporarily put out of operation. Such a halt may be prevented by a service plan foreseeing use of a replacement robot, but otherwise there may be no other option than to stop the production line to remedy to such a maintenance stop, causing inefficiencies. Such inefficiencies may be particularly evident in cases where the automation task in maintenance mainly wears only a few, or even just a single robot actuator, while other actuators could still remain in duty for a reasonable amount of time.

However, in consideration of each repair and exchange of parts of the robot, recently, a modular robot where a driving unit is easily mounted to and dissembled from a body is being commercially used. For example, a robot may be completely fabricated by coupling and assembling a plurality of modules which take charge of functions of a body and a driving unit.

Modular reconfigurable robots may be the remedy to both challenges described above. Such robots are built with the aim of facilitating a worker to quickly assemble and use a specifically-suited robot for the respective task at hand, wherein such robot may be built using dedicated reconfigurable modular robot components.

In the case of modular reconfigurable robots, maintenance can be done selectively for individual, quickly-replaceable components, minimizing the down-time of the production line.

For normally operating the modular, reconfigurable robot, the modules should be coupled to each other both structurally and electrically. In order to for the modules to be connected structurally and electrically, the easiness of assembling and dissembling of modules of a robot and the completeness of structural or electrical coupling between modules are relevant to assess its ease of operability.

Several electro-mechanical solution proposals have been set forth to implement such modular components, yet successful use and exploitation of modular reconfigurable robots still faces challenges due to a lack of methods around these electromechanical systems to actually exploit the versatility of reconfigurable robots, making these features accessible by the user.

For instance, the reconfigured modular robot shall perform just as a specialized non-modular robot would do and the human user shall be able to instruct the robot as quickly as its (self-)reconfiguration takes place.

Providing interfaces to facilitate robot reconfiguration on-the-fly to any robot user may be a challenge, at least insofar as in addition to the robot physical topology, reconfiguration comprises also the entire software and control architecture must self-reconfigure along with the user interface in order to actually facilitate using the robot for solving the task or to automate the process.

Robot controllers use complex mathematical models of robot kinematics and dynamics, so that deriving these models manually may be time consuming and error prone. Despite the fact that computer-based tools using standardized robot description formats (Denavit-Hartenberg, XML-based URDF/SRDF standards) exist, inserting mathematical parameters of a reconfigured robot into a computer may be tedious and represent a source of error.

Assuming that, despite the challenged discussed in the foregoing, the robot may be properly reconfigured, there is a further difficulty in programming it to perform the task for which it has been reconfigured.

Classical textural programming may be further time consuming, eroding the prospective time-reduction benefit provided by using reconfigurable robots for frequently varying processes.

As long as the burden of substantially time-consuming operations such as registration of module assembly, mathematical modeling and software programming tasks relies to the user, frequent reconfiguration of robots remains impractical and causes any benefit associated with the reconfigurability to vanish.

A further limitation may arise in that potential beneficiaries of reconfigurable robot technologies are skilled manufacturing and production workers in small and medium sized enterprises, who are not robotic experts, yet conventional reconfigurable robots are mainly accessible by skilled robotics expert, who can derive and debug and tune the models and controllers.

Simple and frequent reconfiguration of the robot has little benefit, if instructing the robot thereafter requires a) a robotic programming expert b) a lot of time.

Once again, the heavy burden for the user in exploiting reconfigurable robotic technology is preventing its diffusion.

Soft human-robot collaboration may facilitate kinesthetic teaching and instruction by expert and also non-expert robot users.

For instance, the following documents may be exemplary of activity in the field:

U.S. Pat. No. 9,475,199, discussing a robotic manipulator arm including joints that are attachable and detachable in a tool-free manner via a universal mating adapter, wherein the universal mating adapter includes a built-in electrical interface for an operative electrical connection upon mechanical coupling of the adapter portions, wherein the universal mating adapter includes mechanisms and the ability to store and communicate parameter configurations such that the joints can be rearranged for immediate operation of the arm without further reprogramming, recompiling, or other software intervention;

U.S. Pat. No. 9,853,386 B1, discussing a module connection mechanism for coupling adjacent modules, wherein the connector has a substrate having a plurality of terminals for transmitting power and signals installed between the modules, a fixing body disposed to surround the substrate and having a fixing wing with a wing thread formed at an outer surface thereof, and a fixing ring disposed to surround the fixing body and having a ring thread formed at an inner surface thereof, so that the ring thread moves to cover an outer surface of the fixing body.

ES2661067B1 discussing a method of determining the configuration of a modular robot that allows to carry out the configuration of robots from its different components. In order to carry out said method, inertial data is used that are captured by, or are defined in, elements inserted in each of the different components that make up the robot, wherein from this data it may be possible to determine the location of each of the components, as well as their different capacities, which allows the reconfiguration of a robot when a component is inserted or removed, wherein the method also allows generating a physical map of the robot from the location data of each of the components.

OBJECT AND SUMMARY

Despite the activity in the field, an improved solution is still missing.

An object of one or more embodiments is to contribute in providing such an improved solution.

According to one or more embodiments, that object can be achieved by means of an electromechanical interface (EMI) of a configurable modular robot having the features set forth in the claims that follow.

One or more embodiments may relate to a corresponding robot module and configurable robot system.

A configurable modular robot comprising a plurality of robot module types may be exemplary of such a system.

One or more embodiments may relate to a corresponding method of configuring a modular configurable robot.

A method for automatic on-the-fly robot topology recognition, kinematic and dynamic model as well as controller generation and tuning implemented in a master/slave software framework and enabled by a custom electronic slave device specifically developed and integrated into each and every modular robotic component may be exemplary of such a method.

In particular it is described a modular configurable robot, comprising a set of robot modules, each robot module in the set of robot modules comprising:

a coupling mechanism arranged to at least one end of said robot module configured for coupling with a corresponding coupling mechanism of an adjacent module to form an electromechanical interface, said coupling mechanism including a mechanical coupling member and an electrical coupling member, said electrical coupling member being configured to form an operative electrical connection with a corresponding electrical coupling member of said adjacent module upon coupling of the respective mechanical coupling members, said operative electrical connection comprising a network communication signal connection and a power supply connection, said electrical coupling member comprising an electric orientation signaling arrangement configured to form upon said coupling an orientation electrical signal which value depends on the relative orientation of the coupling of said robot module with respect to the adjacent module, at least one integrated circuit comprising:
i) a microcontroller circuit portion comprising a non-volatile memory circuit portion configured to store a unique identification code of the robot module and at least one set of I/O ports coupled to said electrical coupling member to receive said orientation electrical signal, said microcontroller circuit portion being configured to obtain from said orientation electric signal an information on a relative orientation of the coupling of said robot module with respect to the adjacent module,
ii) a communication network slave module comprising a set of communication ports and a slave module memory set of registers configured to store state values of said communication ports, the communication network slave module being coupled to the microcontroller circuit portion to exchange signals, wherein one of said communication ports is pre-designated as input communication port and wherein said ports of the set of communication ports are configured to be in either an open or closed state as a function of a respective port state value stored in said slave module memory set of registers, wherein said modular configurable robot further comprises a master robot module comprising a master network communication module coupled in signal exchange relationship to said communication network slave modules to form a master slave communication network topology, in particular a EtherCAT network, a server device configured to host a centralized robot module database or lookup table comprising a set of records containing robot module parameters, in particular functional, kinematic and inertial and semantic parameters, accessible by a respective unique identification code, said master network communication module being configured to access said communication network slave module to retrieve the respective unique identification code, and said centralized robot module database or lookup table to obtain a corresponding record containing robot module parameters, and said microcontroller circuit portion to retrieve said information of a relative orientation of the coupling of said robot module with respect to the adjacent module.

In variant embodiments, said electrical coupling of said module is a male coupling comprising an arrangement of plug circuit elements and said electrical coupling of said adjacent module is a female coupling comprises an arrangement of socket ports, wherein at least one plug circuit element in the arrangement of plug circuit elements is configured to be selectively electrically coupled to at least one socket port in the arrangement of socket ports when said male electrical coupling is coupled to said female electrical coupling, said at least one set of I/O ports being couplable to at least one of said plug or socket arrangement of circuit elements of said at least one EMI.

In variant embodiments, said plug arrangement of circuit elements of said male electrical coupling comprises a set of electric impedances, and
 wherein said at least one arrangement of socket ports is configured to electrically couple to ground at least an electric impedance in said set of electric impedances when coupled to said female electrical coupling.

In variant embodiments, said plug arrangement of circuit elements further comprises a set of interface connectors on a first surface of the male electrical coupling and a further connector configured to provide a set of signals at respective pins, said signals having in particular a default value, the further connector coupled to a second surface opposed to said first surface,
 wherein said set of electric impedances of the male electrical coupling each have a first terminal coupled to a respective pin of the further connector and a second terminal coupled to a respective interface connector of the interface connectors, and
 wherein said female electrical coupling is configured to electrically couple to ground one impedance elements in said set of impedance elements when coupled to said arrangement of socket ports, said at least one set of I/O ports of said integrated circuit being configured to be coupled to said further connector and to receive therefrom an electric signal at a respective connector pin.

The description refers also to a method of configuring a modular configurable robot, the method comprising:
 an initialization operation comprising providing at least modular configurable robot according to any of claims 1 to 4 configured to perform a given automation task,
 an assembly operation comprising operations of coupling and/or uncoupling at least one robot module of the plurality of robot modules of said configurable robot, coupling or uncoupling therebetween said electromechanical interface, generating a ring or chain network in said plurality of robot modules between said master communication module and said slave communication modules,
 an automatic configuration stage comprising:
 a) a virtual network topology detection operation comprising accessing by said master network communication module said respective port state values stored in said slave module memory set of registers of said ring or chain network of network communication slave modules and computing at said master network communication module a graph structure, having the slave modules as nodes and the connection among their ports as edges of said graph structure, representative of a virtual topology of the communication network of the assembled configurable robot as a function of said respective port state values;
 b) a relative orientation detection stage comprising acquiring said information of a relative orientation of the coupling of said robot module with respect to the adjacent module and associating said information of a relative orientation to the respective nodes in said graph structure,
 c) a configuration retrieval stage comprising retrieving from said centralized module database or lookup table, as a function of said unique identification code stored in said accessed slave module set of registers corresponding records containing robot module parameters,
 a topology reconstruction stage comprising generating an updated robot kinematics and dynamics model, as a function of said graph structure representative of the detected virtual topology including said information of a relative orientation and said robot module parameters.

In variant embodiments, the method further comprises a controller configuration stage comprising reconfiguring the software of the controllers of said updated robot kinematics and dynamics model, providing a configured robot to a user as a result.

In variant embodiments, the method further comprises a user interaction stage wherein a user selects whether to iterate said stages of the automatic reconfiguration stage.

In variant embodiments, said configuration retrieval stage comprises activating the master controller to, sequentially, perform operations of:
 retrieving respective unique identification codes stored in said non-volatile memory circuit portion of the microcontroller circuit of the respective communication network slave module of respective robot modules of the assembled robot,
 querying the master database as a function of said retrieved respective unique identification codes stored in said non-volatile memory circuit portion of the microcontroller circuit of the respective communication network slave module of respective robot modules of the assembled robot,
 receiving said at least one set of module parameters among functional, kinematic, inertial and semantic parameters as a result of said query.

In variant embodiments, the method further comprises said topology reconstruction stage comprises:
 applying recursively traversing processing to said computed and annotated graph,
 generating a robot kinematic model as a function of said kinematic parameters collected for nodes of said the processed graph, wherein edges of said graph are translated into spatial transforms between the respective ports of the communication network slave modules, wherein the spatial transforms are then written to a file using a tree-structured format,
 generating at least one mesh file representing the robot modules and at least one tag associating the semantic module information thereto,
 aggregating and structuring into at least one tree-like data format standardized robot description preferably an XML-based Universal Robot Description Format, and
 aggregating and structuring further inertial parameters and limits to a further tree-like data format standardized robot description, wherein said limits comprise kinematic, differential or dynamic constraints, preferably using a Semantic Robot Description Format.

In variant embodiments, the controller configuration stage includes that said software is configured according to an architecture comprising
 a first low layer, comprising decentralized embedded software stored in the controller memory in each and every robot module forming the configurable robot, said decentralized software level being in particular configured to perform the principal module functionality along with a software interface for centralized inputs and data exchange over the communication network;
 a second middle layer, coupled to the first "lowest" layer via the communication network, in particular EtherCAT, master, configured to operate in real time, in particular performing computation within predictable timing constraints, allowing bi-directional communication between centralized software modules in the master module and the decentralized embedded software modules inside the hardware robot modules, a third high layer configured to run non real time applications by non-real-time threads, which asynchronically receive data from the second middle layer and send command references to it.

In variant embodiments, the controller configuration stage includes, to provide a reconfigurable control architecture of the robot, performing a passivity-based control frame and quadratic programming including:

modeling the lowest level controllers on each module as passivity based decentralized joint torque controllers, describing automation tasks for the robot as convex quadratic programs formulated as cost-functions to minimize under linear constraints.

In variant embodiments, the controller configuration stage includes defining the cost function as a function of a matrix of cost-functions having for column and rows the respective degree-of-freedom (DOF) of the modular robotic structure and the number of degrees of freedom of the task performing controller reconfiguration by adding or removing rows in the matrix equations of cost-functions corresponding to the degree of freedom of the added or removed robot modules.

The description refers also to a computer program product loadable into the memory of at least one processing circuit and configured to execute the method of any of the previous embodiments when run in said at least one processing circuit.

The claims are an integral part of the technical teaching provided herein with reference to the embodiments.

BRIEF DESCRIPTION OF THE SEVERAL VIEWS OF THE DRAWINGS

One or more embodiments will now be described, by way of non-limiting example only, with reference to the annexed Figures, wherein:

FIG. 10 is an exemplary diagram of a portion of the electronic device of FIG. 9, FIG. 11 is an exemplary diagram of a Ethercat network.

DETAILED DESCRIPTION OF EXEMPLARY EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings may be in simplified form and are not to precise scale. For the sake of simplicity, directional (up/down, etc.) or motional (forward/back, etc.) terms may be used with respect to the drawings. The term "couple" and similar terms do not necessarily denote direct and immediate connections, but also include connections through intermediate elements or devices. Like or identical references may be used to indicate common or similar elements. For the sake of clarity, not every similar or common element is referenced in the figures.

Figure 1:
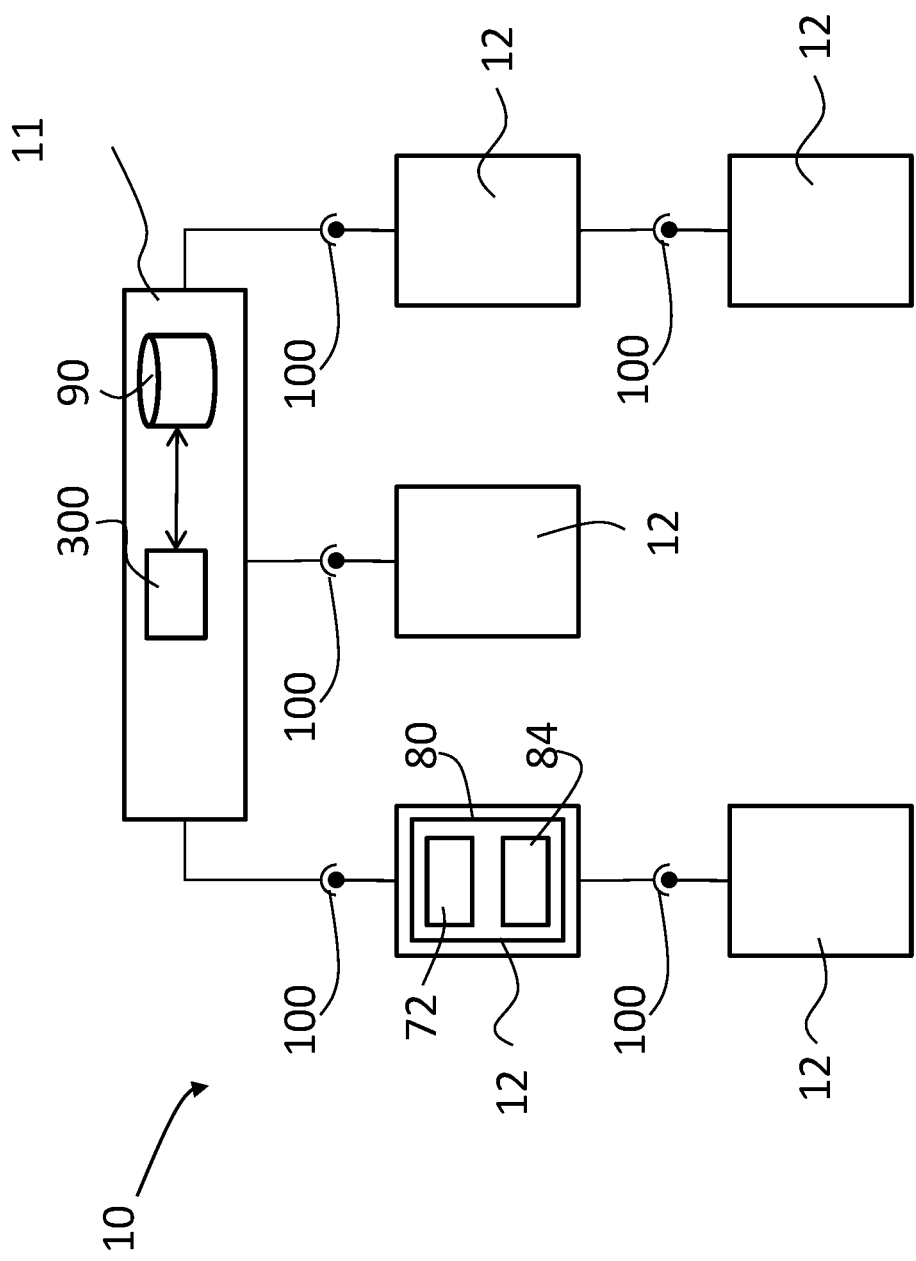
FIG. 1 is a schematic block diagram of a configurable robot as per the present disclosure.
Figure 16:
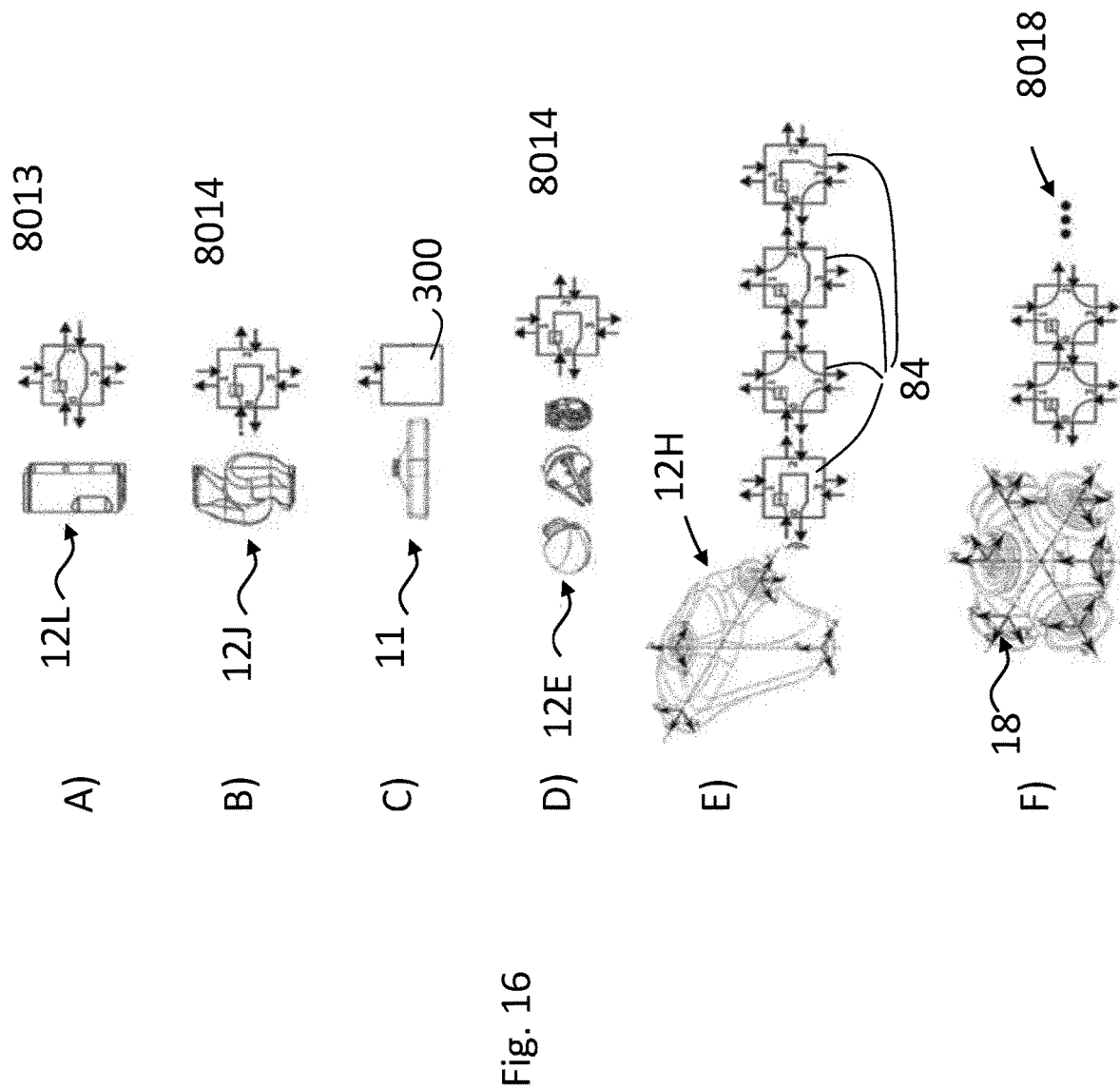

FIG. 1 is an exemplary schematic diagram of one or more embodiments of a modular configurable robot 10. Robot modules here are represented by blocks. Such modular configurable robot 10 has a master slave architecture, thus includes a set of slave robot modules 12 and a master robot module 11. The set of slave robot modules 12 includes slave robot modules 12 coupled to one another through electromechanical interfaces, or EMI, 100, to form chains and coupled to the master robot module 11 by the same EMIs 100. As better detailed in the following FIG. 16, the master slave architecture is implemented by a master slave communication network architecture, where a master communication node 300 is included in the master robot module 11 and communicates through signal passing through said EMI 100 which slave communication modules 84 arranged in each of the slave robot modules 12. Each slave robot module include a controller module 52, as shown in FIG. 2, which controls the specific functions of the robot module 12, i.e. controls and drives servomotors and actuators to perform the kinematic required for that slave module 12 and/or acquires values and controls sensors or controls other functions performed by that specific slave robot module 12.

Figure 2:
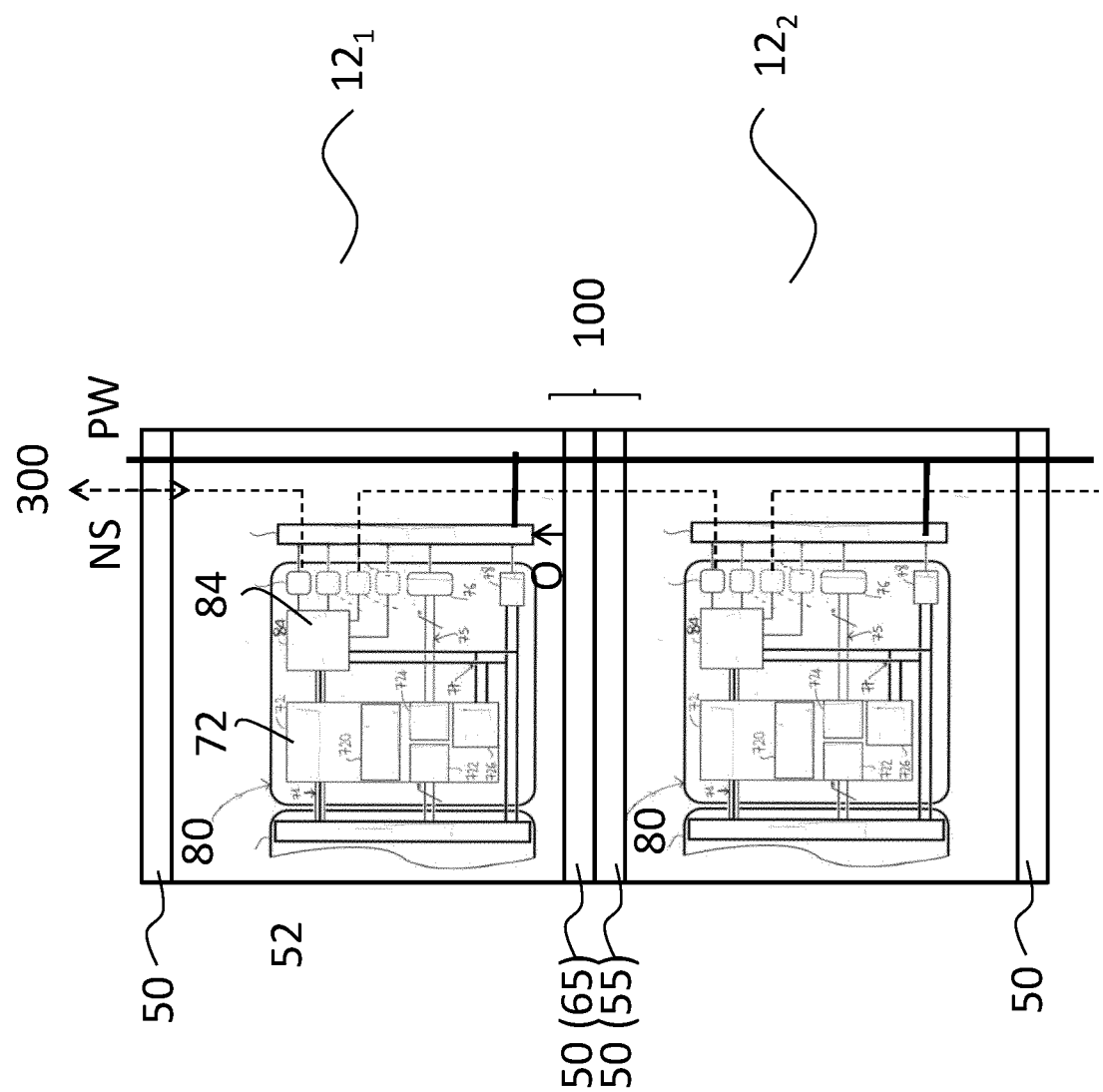
FIG. 2 is a schematic block diagram of a robot portion as per the present disclosure.

The master module 11 includes also a server device configured to host a centralized robot module database 90, comprising a set of records containing robot module parameters, in particular functional, kinematic and inertial and semantic parameters, accessible by a respective unique identification code I, which, as shown in FIG. 2, is stored in a processor module 72 of each robot module 12. In variant embodiments the server device or the robot module database 90 may not be arranged inside the master module 11, but may be disposed outside, in particular remote, for instance being accessed by the master communication node 300 by a wireless link. The master module 11 may also include a further processor equipped module to perform other functionalities required to the master module 11 or such functionalities can be performed by the circuitry of the module 300 itself.

FIG. 2 is an exemplary diagram of one or more embodiments of a portion of modular robot assembly 10, which includes two robot modules, a first robot module $12_1$, which may be the module upstream with respect to the coupling chain toward the master module 11, and an adjacent module $12_2$, which are operatively coupled one to the other. Each of these robot modules $12_1$, $12_2$ includes at its ends a coupling mechanism 50 which is configured to couple with a corresponding coupling mechanism 50 of the adjacent module $12_2$. Each coupling mechanism 50 includes a mechanical coupling member, specifically a flange, and an electrical coupling member. When two coupling mechanisms 50 of two robot modules are coupled, it is formed such electromechanical module interface (briefly, EMI) 100.

As show schematically each slave robot module 12 includes a controller module 52, which is the module driving the motors and/or actuators and/or the sensors of the robot module according to its function. Each slave robot module 12 further includes associated to each coupling mechanism 50 a slave electronic control module 80 which includes a processor module 72 and a slave communication module 84, as better detailed in FIG. 9.

In FIG. 2 it is shown a power line PW bringing the power supply to the modules 72, 84 and 52, which passes through the EMI interface 100. Also are indicated network signals NS passing through the couplings 50 and the EMIs 100 to reach the slave communication modules 84 to enable network communication between the slave modules 84 and the master module 300 and among the slave modules 84 themselves.

The coupling mechanism 50, arranged to at least one end of said robot module 12, i.e. a first module $12_1$, which is configured for coupling with a corresponding coupling mechanism of the adjacent module, i.e. $12_2$, to form the EMI 100, includes a mechanical coupling member, embodied for instance by a flange 56 or 66 as shown in FIG. 6B, and an electrical coupling member, embodied for instance by a electrical board 57 or 67 as shown in the same FIG. 6B. Preferably the coupling mechanism 50 of the upstream module $12_1$ may be a male coupling mechanism 65 and the coupling mechanism of the adjacent module $12_2$ may be a female coupling mechanism 55. The electrical coupling member 57, 67 of a robot module, e.g. $12_1$, is configured to form an operative electrical connection with a corresponding electrical coupling member of said adjacent module $12_2$ upon coupling of the respective mechanical coupling members 56, 66, when the EMI 100 is formed. Such operative electrical connection of the EMI 100 comprises a network communication signal connection, i.e. for signal NS, and a power supply connection, for power PW, as mentioned, however said electrical coupling members 57, 67 comprise respective orientation detecting arrangements configured to form upon said coupling an orientation electrical signal O which value depends on the relative orientation of the coupling of said upstream robot module $12_1$ with respect to the adjacent module $12_2$. The orientation electrical signal O is supplied to the slave processor module 72 of the upstream robot module 12, which is in signal exchange with the slave network module 84, thus the slave processor module 72 of the robot module can obtain an indication of the relative orientation on the basis of the orientation electrical signal O which can be transmitted over the communication network in the network signals NS to the master module 300. As better explained in the following the slave processor module also stores an identification code I which identifies the specific robot module 12. As better shown in FIG. 7 the slave processor module 72 also is configured to send commands C to the controller module 52.

Figure 3:
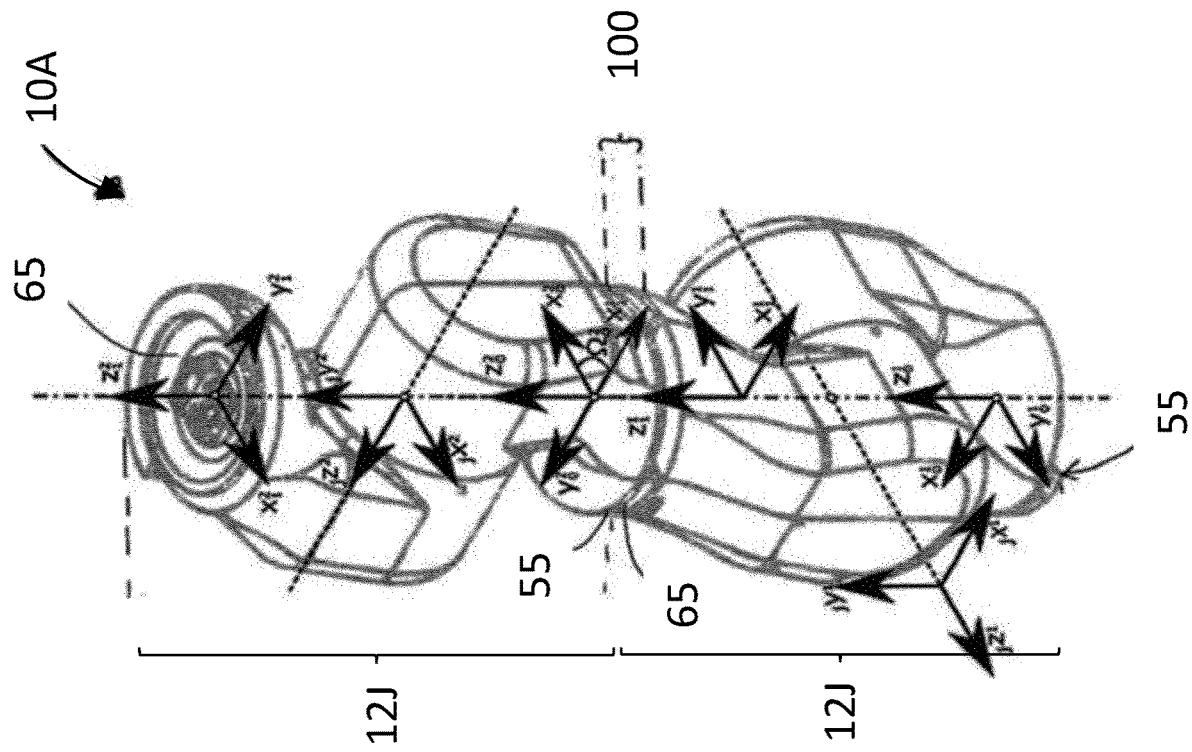
FIG. 3 is an exemplary diagram of a robot portion as per the present disclosure.

FIG. 3 is an exemplary diagram of an embodiment of a portion of modular configurable robot 10, which may embody the schematics of FIG. 2 in the form of an arm-like modular robot assembly 10A comprising two robot modules $12_1$, $12_2$ in the form of joints 5. When the assembly is formed from a plurality of joints 5, each joint 5 may be selectively coupled to an adjacent joint 5 by an EMI 100, including corresponding coupling mechanisms 50.

The assembly of joints 12J includes also EMIs 100 where the coupling mechanisms 50 at each EMI are respectively a socket or "female" coupling mechanism 55, as well as a plug or "male" coupling mechanism 65.

Arbitrary conventions using arbitrary coordinate representations (spatial algebra, Denavit-Hartenberg convention, Dual-Quaternion theory, etc.) can be used to assign/associated a coordinate frame to any robotic module.

For instance, frame axes X, Y, Z may be associated to the arm-like assembly, as well as to individual coupling mechanisms 50 comprised in the assembly.

For instance, in a coordinate frame convention exemplified in FIG. 1, the Z axis associated to the EMI 100 is the axis normal to the surface of the EMI 100 and pointing towards the "outside" of the arm-like assembly.

As mentioned, the EMI 100 comprises two coupling mechanism 55, 65, wherein an individual frame may be associated to each portion of the EMI 100, wherein such coordinate frames in a connected electromechanical module interface are by default coincident. For instance, they can have an orientation offset 11 about the common Z axis.

As exemplified in FIG. 1, for instance:
a first EMI 100 may have a first coordinate frame $X_0^1$, $Y_0^1$, $Z_0^1$ associated thereto,
a second EMI 100 may have a second coordinate frame $X_2^1$, $Y_2^1$, $Z_2^1$ associated thereto,
a third EMI 100 may have a third coordinate frame $X_0^2$, $Y_0^2$, $Z_0^2$ associated thereto,
a fourth EMI 100 may have a fourth coordinate frame $X_2^2$, $Y_2^2$, $Z_2^2$ associated thereto.

The subscript indicates the communication port of the slave communication module 84 associated to the EMI 100 and the superscript indicate the slave robot module 12 number, in this case 1 or 2 since there are two robot module, i.e. joints 12J.

FIG. 2 is an exemplary diagram of an integrated system, called modular robot 10, comprising a master module 11 embodied by a robot base, then slave modules 12 including a "hub" robot module 12H, at least one arm-like assembly including two joint module 12J, at least one "link" robot module 12L and at least one end-effector 12E, for instance a gripper tool. At least one of the EMIs 100 couples the robot main base 11 to one and of the arm-like assembly module 10A (for instance, via the robot hub 12H) while at least one further EMI 100 couples the other end of the assembly 1 to the end-effector 12E (for instance, via the link robot module 13).

Figure 5A:
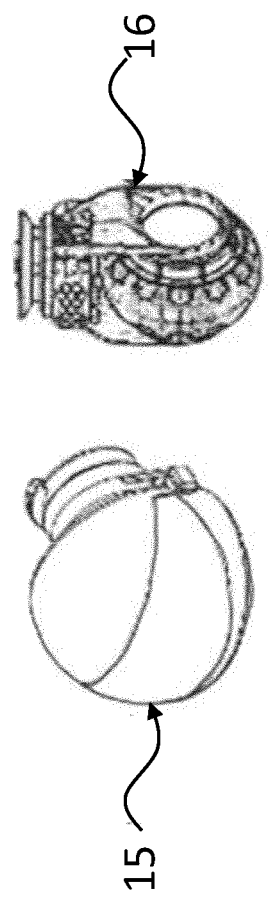

FIG. 5A comprises exemplary diagrams of other embodiments of an end-effector 12E. For instance, the end-effector 12E may comprise:
- a first tool 15, as exemplified in portion a) of FIG. 3, for instance a sensor tool configured to measure environmental conditions or tool performance for diagnostics, and/or
- a second tool 16, for instance a mobility tool 86 comprising at least one wheel.

Figure 5B:
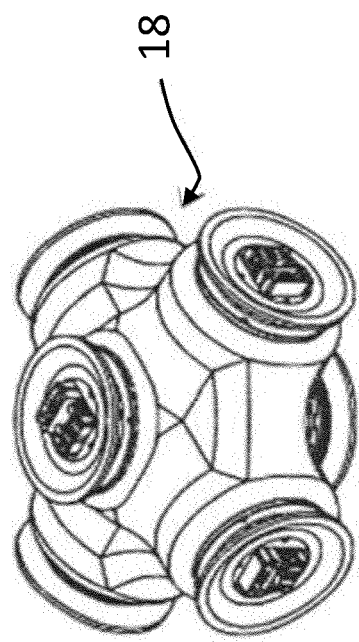

FIG. 5B is an exemplary diagram of other embodiments of the hub robot module 12H, for instance a "twin" hub module 18. For instance, a first hub module 12 may be configured to couple the master module or base 11 with up to two other robot assemblies, and a second twin hub module 18 may be configured to couple the base module 11 with up to four other robot assemblies. This can be extended to general multi-hubs by including more than just two hubs.

Figure 4:
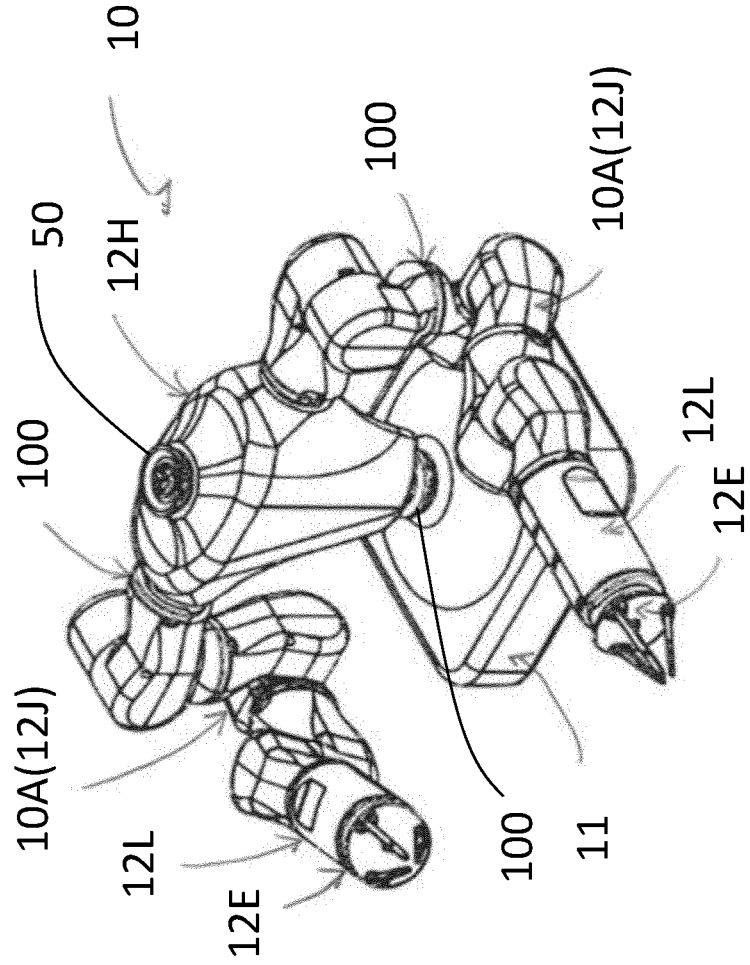
FIG. 4 is an exemplary diagram of a robot as per the present disclosure, FIG. 5, comprising portions A) and B), is an exemplary diagram of end-effector embodiments and a multi-hub robot module as per the present disclosure, FIG. 6, comprising portion a) and b), comprises exemplary views of an electromechanical module interface as per the present disclosure, FIGS. 7 and 8, comprising respective portions a) to d), are exemplary views of portions of the electromechanical module interface of FIG. 6.

In one or more embodiments as exemplified in the exploded view of FIG. 4B, the EMI 100 comprises two coupling mechanisms 50 which in the embodiment here described are a female mechanism and male mechanism respectively, i.e. a female coupling mechanism 55 and male coupling mechanism 65. As better shown in the following, the mechanical coupling is preferably the same for mechanisms 50, while it is the electrical coupling which may be configured to have a male member and female member in the two coupling mechanisms forming the EMI 100. However, the solution here described is not limited to EMI 100 formed by a female and a male mechanism.

In one or more embodiments, the electromechanical module interface 100 may be configured to facilitate:
a) quick resilient mechanical coupling between modules,
b) quick reliable power and communication connection between modules,
c) automatic inference of the relative module mounting orientation.

In one or more embodiments, robotic modules available to build a configurable robot 10 in a custom way by a user may be configured so that:
- a link module 12L may comprise one male coupling mechanism 65 and one female coupling mechanism 55 coupled at respective ends,
- a joint module 12J may comprise one male coupling mechanism 65 and one female coupling mechanism 55 coupled at respective ends, as exemplified in FIG. 1,
- a base module 11 may comprise one female coupling mechanism 55,
- an end-effector module 12E, e.g. modules 15, 16 may comprise one male coupling mechanism 65,
- a single hub 12H and/or multi-hub, for instance twin hub 18, module may comprise all female coupling mechanism 55 but one male coupling mechanism 65.

Such a distribution of EMI modules 100 may facilitate assembling flexibility, providing a user with an ample set of possible robot configurations.

For instance, as exemplified in FIG. 4B:
the coupling mechanism female assembly 55 may comprise:
i) a female flange body 56, for instance an annular connector body 56, representing the mechanical coupling, comprising a hollow member with a conical flange shape, the hollow space within the member 56 configured for accommodating a female interface board 57,
ii) the female interface board 57, representing the electrical coupling, comprising a connector 574 coupled to a first surface of a printed circuit board (briefly, PCB) circuit 575,
iii) optionally, a first locking element, for instance a half-ring 58, configured for securing coupling between female and male portions of the EMI;

the coupling mechanism male assembly 56 may comprise:
i) a male flange body 66, representing the mechanical coupling, for instance an annular connector body 66 substantially identical to the female flange body 56, configured for accommodating a male interface board 67,
ii) the male interface board 67, representing the electrical coupling, comprising a respective male PCB circuit 575,
iii) optionally, a second locking element, for instance a half-ring 68, configured for securing coupling between female and male portions of the EMI;

In one or more embodiments, robot modules 11, 12, 13, 14, 15, 16, 18 can be equipped with pins or keys for radial alignment and increased torque transmission, as well as sealings for ingress protection.

In one or more embodiments, the ring structure 58, 68 may fit around the coupled flange bodies 56, 66. For instance, the ring structure 58, 68 may facilitate further increasing torque transmission capacity, facilitating keeping both interfaces 56, 66 axially coupled.

In one or more embodiments, the ring may be split into smaller fractions then two-halves.

In one or more embodiments, neighboring ring elements 58, 58 can be joined with screws, bolts or hinges.

In one or more embodiments, the ring 58, 68 can be closed around the EMI 100 using a latch-lock mechanism, or by using screws.

For instance, a robot module 12 may advantageously comprise as an interface a locking mechanism which might employ use of a single tool or no-tool by a user to be assembled, facilitating to "mate" modules therebetween and safely lock them together.

FIGS. 5 and 6 are exemplary diagrams of different views of embodiments of the female electrical coupling 57 and male electrical coupling 67, respectively.

In one or more embodiments as exemplified in portions A) to D) of FIG. 5, the female PCB circuit 575 of the female electrical coupling mechanism 57 may comprise a front surface 570a and a back surface 570b, wherein the front surface 570a comprises:
- a set of female EMI connectors 571 soldered to the PCB circuit 575, for instance four connectors,
- a set of screw holes 572, configured to mechanically couple the female connection PCB 575 on the respective female flange body 56,
- a set of holes 573, where the power bus leads are soldered to the PCB 575 as well as the soldering points 574 for the communication wire connector.

In one or more embodiments, the back surface 570b of the female PCB circuit 575 of the coupling mechanism female portion 55 may comprise:
- soldering points of the corresponding female interface connectors 571,
- a communication wire connector 574,
- corresponding screw holes 572 configured to mount the female connection PCB 575 on the flange body 56, and
- corresponding through-holes 573 for the power bus leads.

Figure 8:
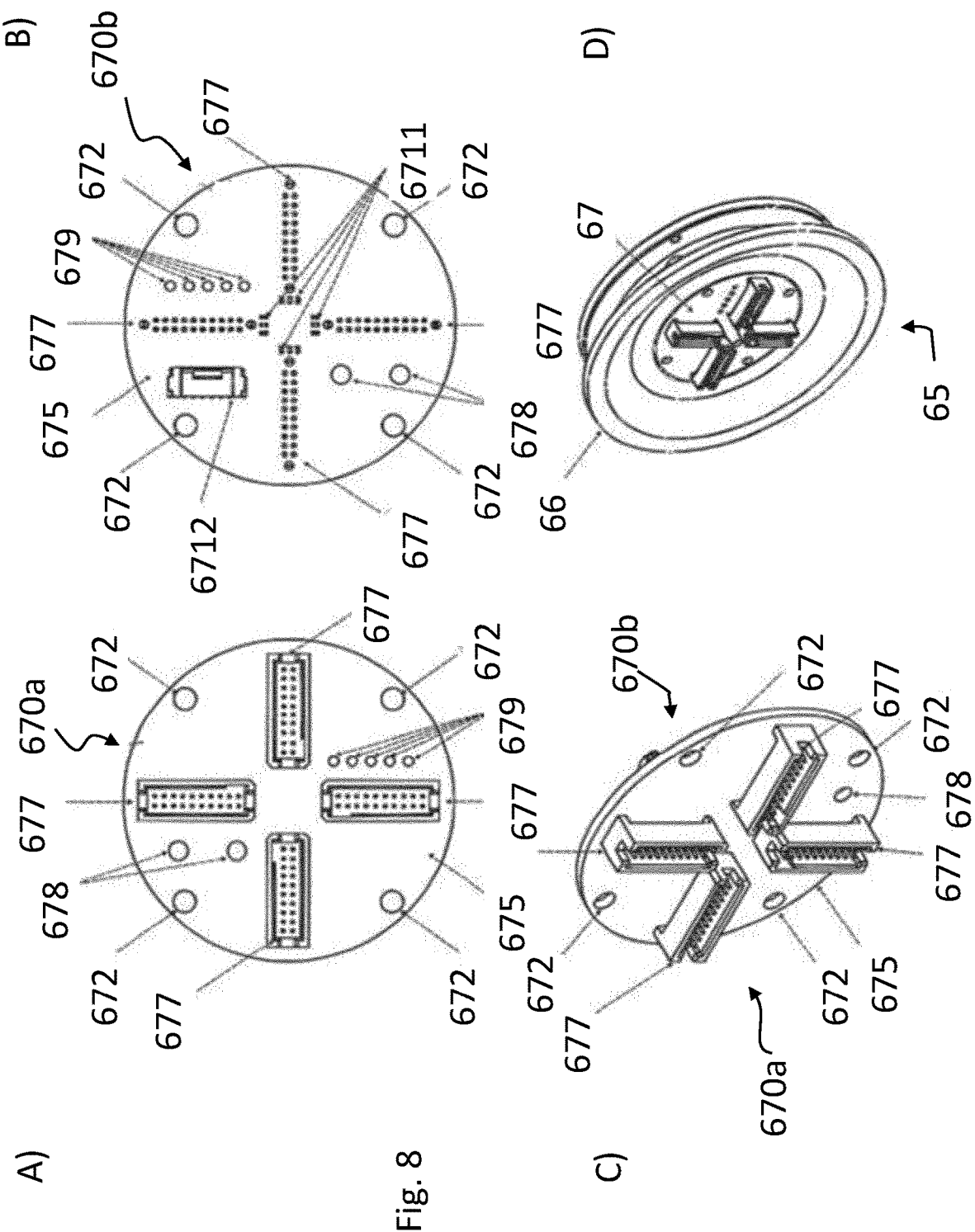

In one or more embodiments as exemplified in portions A) to D) of FIG. 8, the male PCB circuit 675 of the electrical coupling male portion 65 may comprise a front surface 670a and a back surface 670b, wherein the front surface 670a comprises:
- a set of male EMI connectors 571 soldered to the PCB circuit 677, for instance four of them,
- a set of screw holes 672, configured to mechanically couple a male connection PCB 575 on the respective male flange body 66,
- a set of holes 578, where the power bus leads are soldered to the PCB 575 as well as the soldering points 579 for the communication wire connector.

In one or more embodiments, the back surface 670b of the male PCB circuit 675 of the EMI female portion i.e. female coupling mechanism 55 may comprise:
- soldering points of the corresponding female interface connectors 677,
- communication wires 679,
- corresponding screw holes 672 configured to mount the male connection PCB 675 on the respective male flange body 66, and
- corresponding through-holes 678 for the power bus leads.

The male connection PCB 675 further comprises, coupled to the back surface 670b, a set of (surfaces mounted) "pull-up" resistors 6711 along with a surface mounted (briefly, SMT connector 6712.

Figure 7:
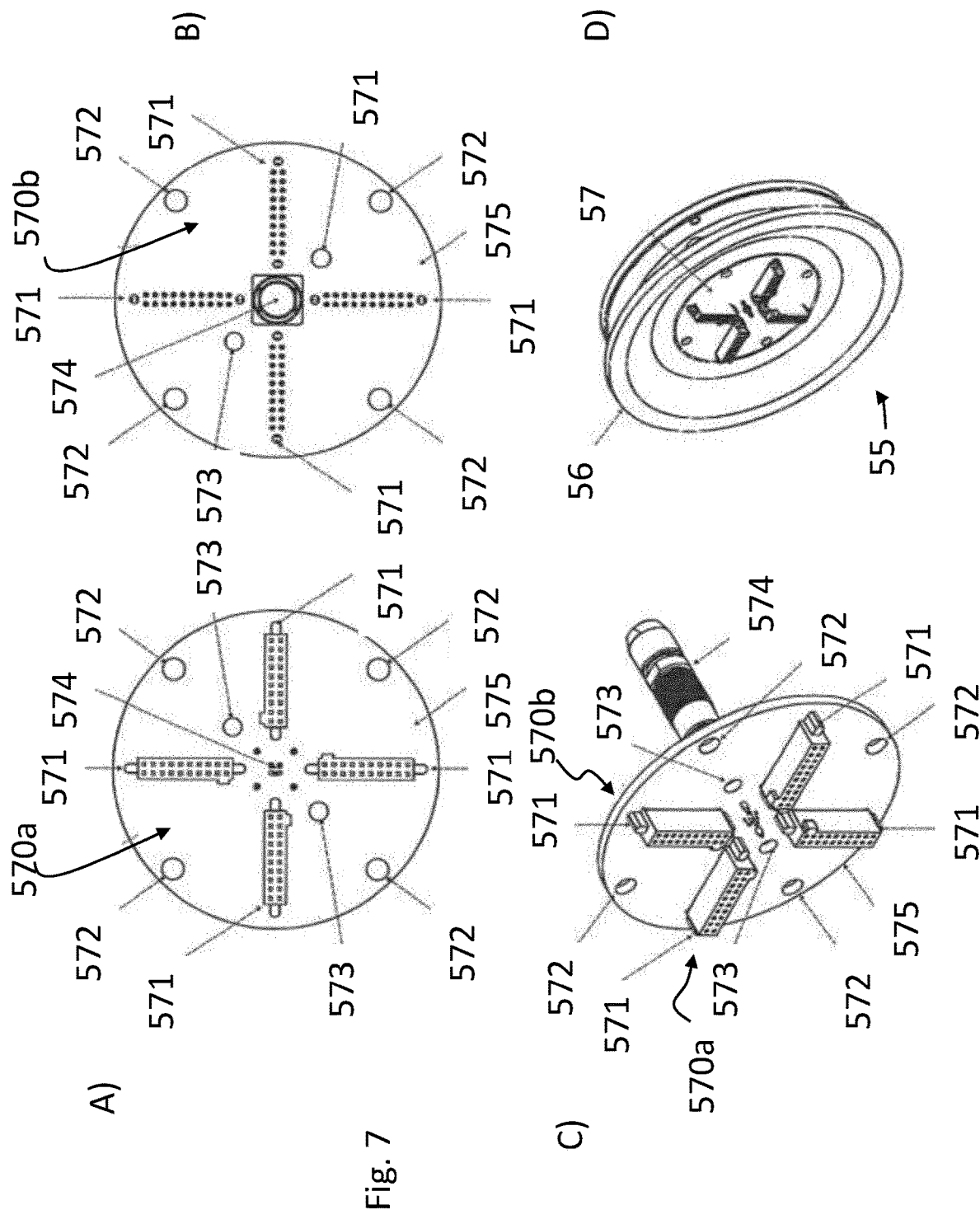

For instance, any pull-up resistor in the set of resistors 6711 may comprise a pair of terminals, wherein a first terminal of any resistor 6711 may be configured to be coupled to a respective (independent) pin of the surface mounted (briefly, SMT) connector 6712, wherein a second terminal of the SMT connector 6712 may be configured to be coupled to a digital input port of the microcontroller 72 in the slave electronic control module 80, or integrated electronic device 80, as discussed in the following (see, for instance, FIG. 7).

In one or more embodiments, digital input ports of the SMT connector 6712 may be configured to have a first default value, for instance a logical HIGH value, when coupled to one terminal of the respective pull-up resistors 6711.

In one or more embodiments, an arrangement of the connector pins may facilitate encoding and performing automated read-out of relative mounting orientation between the robotic modules, as discussed in the following.

In one or more embodiments, slave robot modules 12 may comprise a respective slave electronic control module 80.

Figure 9:
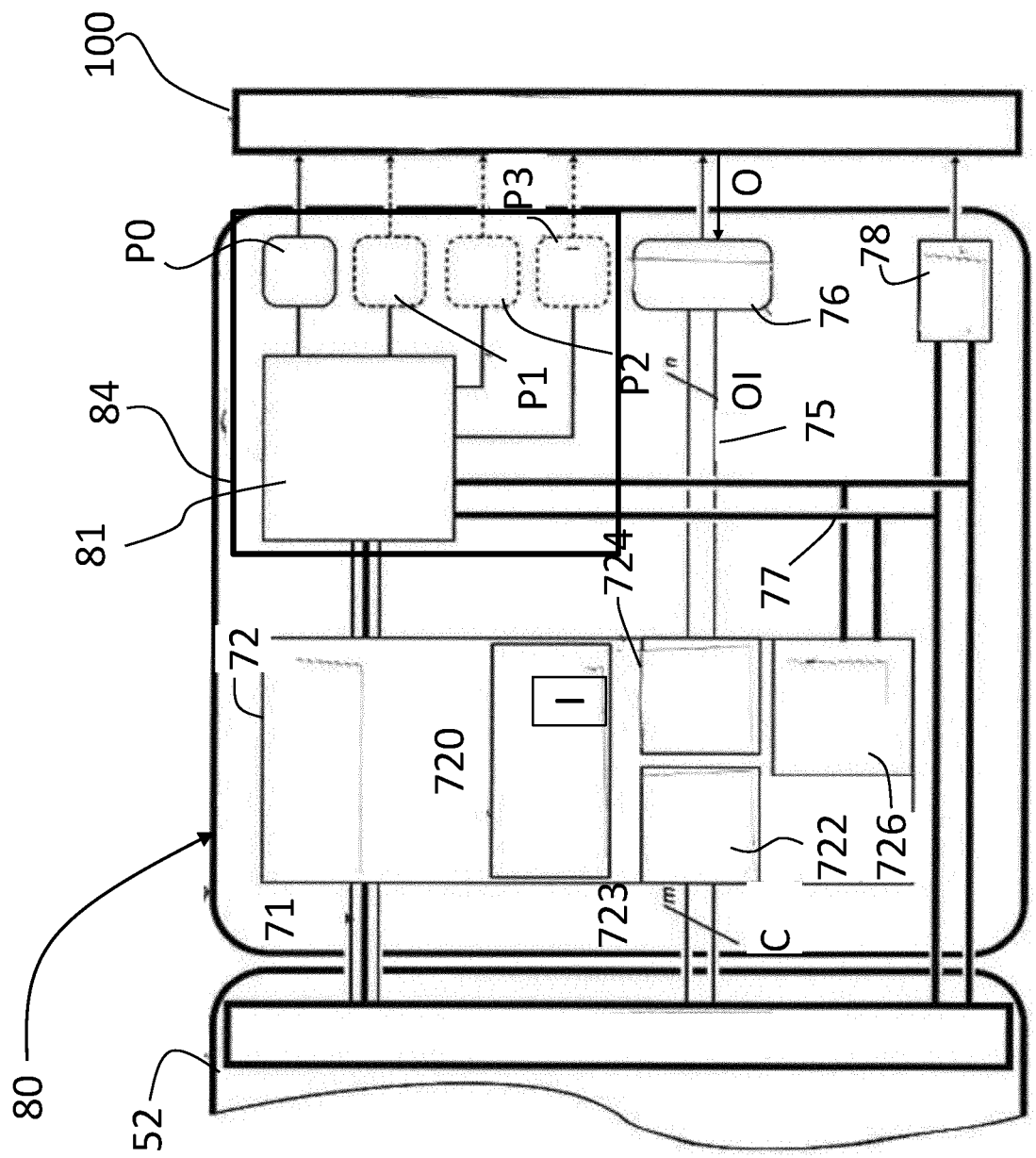
FIG. 9 is an exemplary diagram of an electronic device as per the present disclosure.

Specifically, robot modules 11,12 may comprise a respective slave electronic control module 80 as exemplified in FIG. 9.

In one or more embodiments, an Ethernet for control automation technology, briefly EtherCAT, controller according to an EtherCAT standard may be suitable for use in slave device 80 as salve communication module exchanging network signals NS with the master module 300 and the other slave communication modules.

For instance, the integrated electronic (slave) device 80 may comprise:
- a microprocessor system 72, and
- at least one slave communication modules 84, specifically a EtherCAT (slave) controller 84, (directly) coupled to the microprocessor 72 in signal exchange relationship via a communication interface per se known (e.g., SPI, BLISS, etc.), In one or more embodiments, the slave electronic control module 80 may receive the power supply PW from a same supply of the robotic modules 11, 12 in which it may be integrated. For instance, the device 80 may comprise a power bus 77 configured to "feed" its circuitry.

In one or more embodiments, the slave electronic control module 80 can be implemented on a standalone PCB or it can be integrated with other circuits on the same PCB or PCB stack.

In one or more embodiments, the slave electronic control module 80 may be integrated on a same PCB or on a PCB stack together with a controller module 52, i.e. Module Functional System, in a robot module 12, wherein the Module Functional System may comprise an electronic device implementing robotic module functionality.

As an example, for a robot joint module 12J, the module functional system may comprise motor inverters, electronics, sensors and microprocessors controlling the motor.

In another example, for instance for an end-effector module 12E, the module functional system may comprise amplifier circuits, microprocessors, etc., configured to control the manipulation module, e.g., to open and close a gripper mechanism.

In one or more embodiments, the slave electronic control module 80 can also be "stand-alone", without being connected to any functional module system (for instance, in hub 12H and multi-hub 18 modules).

As shown in FIG. 6, the slave electronic control module 80 is coupled to the electromechanical module interfaces 100. The slave electronic control module 80 may comprise a set of I/O ports 76 of the microprocessor 72 system configured to be coupled to the EMI 100 to implement relative orientation detection, for instance by sensing a voltage across resistors 6711, when first and second coupling mechanisms 50, or 55,65, of the EMI 100 are coupled one to the other.

The microprocessor system 72 of the controller device 80 in the embodiment shown in FIG. 7 comprises:
- a non-volatile memory circuit portion 720, configured to store a module identification code/number I, wherein the identification number is indicative of type and version of the module and is used for physical robot topology recognition, as discussed in the following;
- a first set of I/O ports 722 configured to be coupled to the module functional system 52, specifically configured to be coupled to resistors 6711 on the male electrical coupling 67, for instance to control operating modes and status information exchange therebetween.

For instance, a data bus 723 is arranged between the microprocessor system 72 and the module functional system 52 to enable frequent and larger volume data transfer, e.g. commands C.

The unique identifier I stored in the non-volatile memory 720 may be used as a "keyword" to query a centralized module database 90 as discussed in the following.

The non-volatile memory circuit portion 720 may comprise embedded software code portions to operate the robot module functional systems, e.g. controller module 52, of the robot module, which may be coupled to the microcontroller and configured to be operated thereby.

When both male and female electrical couplings 57, 67 are put together, one of the pull-up resistors 6711 is grounded through the interface connectors 671 and 675, causing one (digital) input port 722 of the microcontroller 72 of the electronic circuit 80 to read a second value, for instance a digital LOW.

For instance, a relative orientation of the male connector 675 with respect to the female connector 575 about the common electromechanical interface axis Z may be detected, as a function of which digital input port in the first set of input ports 722 of the microcontroller receives such a second value, different from the default value. Such an arrangement facilitates detecting one out of, for instance four, possible relative orientations between male and female EMIs 57, 67.

The bridged resistor, and thereby the relative mounting orientation between robot modules, can be automatically detected based on analog or digital I/O ports of the microprocessor 72 of the controller device 80. With an implementation based on digital I/O ports, the resistors serve as pull-up resistors. Depending on the relative mounting orientation, one of the pull-up resistors will be bridged to ground causing only the corresponding digital I/O port to read LOW, while the other I/O ports continue to read HIGH. The LOW reading may directly encode the discrete relative mounting orientation of the two modules.

Thus, a first terminal of the pull-up resistors 6711 connects one pin in the male interface connector 675, while only one of the female interface connectors 571 bridges the signal to ground.

In one or more embodiments, a single analog input port may be used, instead of a plurality of digital ports. For instance, different resistors in the electromechanical module interface are wired such that the analog input port will read distinct voltages for each discrete relative mounting orientation of the two modules.

The Ethercat controller may comprise at least one, in the example four, I/O port P0, P1, P2, P3 coupled to the EMI module 100 via a respective connector 574 configured to couple the controller 80 to the EMI module 100.

For instance, the number of connectors may vary for different modules, so that:
- an end-effector module 12E may comprise one connector 574 coupled to a first port 801 (also indicated as upstream port 801, as discussed in the following);
- a joint 12J, link 12L, (multi-)hub 12H, 18 modules may comprise a configurable set of connectors coupled to respective set of ports 801, P1, 803, P2.

Summarizing, as shown in FIG. 9 (and 2), each module 12 includes at least one integrated electronic slave device 80, with at least one slave controller 84 managing a multiplicity of ports (four ports P0 . . . P3 in the example shown), which are preferably included in said slave controller 84, which can then exchange information with (at least one) microprocessor system 72. Such microprocessor system 72 is controlling the module functional system 52, i.e. the mechatronic system realizing the functionality of the module: for example: inverters with embedded controllers for motors, data processing units and amplifiers and filters for sensors etc, when it is presents: in the case of a hub 12H, for instance a module functional system 52 may not be present. The microprocessor system can expose multiple I/O ports to the EMI 100 to offer additional functionality such as the relative orientation detection.

In one or more embodiments as exemplified in portions A) and B) of FIG. 8, a slave communication module, specifically an EtherCAT Controller slave device, 84 as per the present disclosure may comprise:
- an EtherCAT processor unit (briefly, EPU) 81, and
- at least a first input/output, I/O, port P0 and a further I/O port P1, the input P0 and output P1 ports coupled therebetween and to the EPU 81,
- optionally, further I/O ports P1, P3.

For the sake of simplicity, a four-port slave device 84 as exemplified in portions A) and B) of FIG. 10 is discussed in the following, being otherwise understood that such a discussion is purely exemplary and in no way limiting.

For instance, such a four-port slave device 84 as exemplified in portions a) and b) of FIG. 8 may comprise:
- a first I/O port P0 configured for receiving or transmitting signals, the first port P0 coupled to EPU 81,
- a second, I/O port P1 coupled to the EPU 81,
- a third port P2 coupled to the second I/O port P1,
- a fourth port P3 coupled to the third port P2 and to the input port P0.

As exemplified in portion B) of FIG. 8, any port P0, P1, P2, P3 may be in one of two alternative states:
- a first "open" port state, configured to route received/transmitted signals according to signal paths represented in solid lines, or
- a second "closed" port state, configured to route received/transmitted signals according to signal paths represented in dashed lines.

As exemplified in portion A) of FIG. 8, a diagram of possible signal paths of the device 84 may comprise a curved lines and a straight lines signal path, wherein depending on the connectivity/states of the ports, either the curved or the straight lines (or a combination thereof) may be active; for instance, curved lines may which may be active when all ports P0, P1, P2, P3 are in the first open state, while straight lines may be active when all ports P0, P1, P2, P3 are closed.

In one or more embodiments, the network slave device 84 may be suitable for being operated in an EtherCAT network 30 as exemplified in FIG. 11.

In the following, for the sake of simplicity, embodiments using such a network topology are mainly discussed, being otherwise understood that such examples are in no way limiting and other communication network protocols may be used.

For instance, the first port P0 of the EtherCAT Controller slave device 84 may be referred to as "upstream port" and may be configured to receive signals from an EtherCAT master node 300 of the network 30, as discussed in the following.

As exemplified FIG. 11, an EtherCAT network 30 topology (known per se) may comprise a sequence of p slave device replicas $84_1, 84_2, 84_3 \ldots, 84_p$ which are the modules 84 of each of p robot modules 12 forming a robot 10, wherein each slave device has substantially a structure like in FIG. 10.

For instance, the EtherCAT network of the example considered may comprise:
- four devices $84_1, 84_2, 84_3 \ldots, 84_p$ serially coupled therebetween, having an open ring or a chain-like connection 30,
- an EtherCAT network master device 300 coupled to a first device $84_1$ and to a last device $84_p$ of the serially coupled devices, the master configured to connect the two ends of such a chain or ring connection 30.

The master device 300 may be configured to send one or more information/control signals (known as data telegrams, i.e. network signals NS, to devices $84_1, 84_2, 84_3 \ldots, 84_p$ in the network 30.

For instance, a data telegram may travel through the sequence of coupled devices $84_1, 84_2, 84_3 \ldots, 84_p$ passing from one another and being processed without being stopped, until the telegram eventually travels through the full ring 30, reaching a halt once communicated back to the master 300.

In the considered slave device $84_1$, the telegram sent by the master 300 may be received at the first port P0. Subsequently, the telegram may be provided to the EPU 81, which may be configured to process the received telegram "on-the-fly", exchanging "payload" information destined to the respective slave device in the chain $84_1$, $84_2$. For instance, such an exchange at the EPU 81 may comprise operations of:
- reading or extracting information from the telegram,
- writing or adding information to the telegram.

Subsequently, the EPU 81 may provide the processed telegram to the adjacent port, for instance the second P1.

In the considered exemplary network 30:
- if a device input port P0 is in the first open state, then network data packages are sent through the open port P0 towards a slave connected to such port P0, wherein the network package is received back through the respective slave input port and forwarded to the next port in the sequence.
- the telegram arrives at port P0 within the device 84, which is always the upstream port. Then if port P1 is in closed state, the telegram advances to the next port P2. Eventually the telegram will pass through the first port P0 again on its way back to the master 300;
- EtherCAT (slave) controller devices $84_1$, $84_2$, $84_3$ ..., $84_p$ in different modules 12 may each comprise respective state registers (or stored in the memory 720 of the micro-controller 72) configured to store state values (open/closed) of respective ports P0, P1, P2, P3. Preferably, a slave controller 84 may have in block a register module which is a bank or set of registers, one of such registers for each port. For instance, the state register of each device $84_1$, $84_2$, $84_3$ ..., $84_p$ can be read from the master 300 when devices are chained in the network 30.

It is noted that, if a chained network 30 is established between a plurality of devices $84_1$, $84_2$, $84_3$ ..., $84_p$, a communication link may be active on one port whenever another slave is connected and hence the respective port may be automatically opened, while if the link becomes inactive due to a disconnection of the chained slave device then the coupling port may be automatically closed.

In one or more embodiments, the master 300 may "manually" select open and closed state of the ports P0, P1, P2, P3 of the slave devices 80A, 80B, 80C through a network command, for instance via software accessing the data stored in the state register of the device 84.

Figure 14:
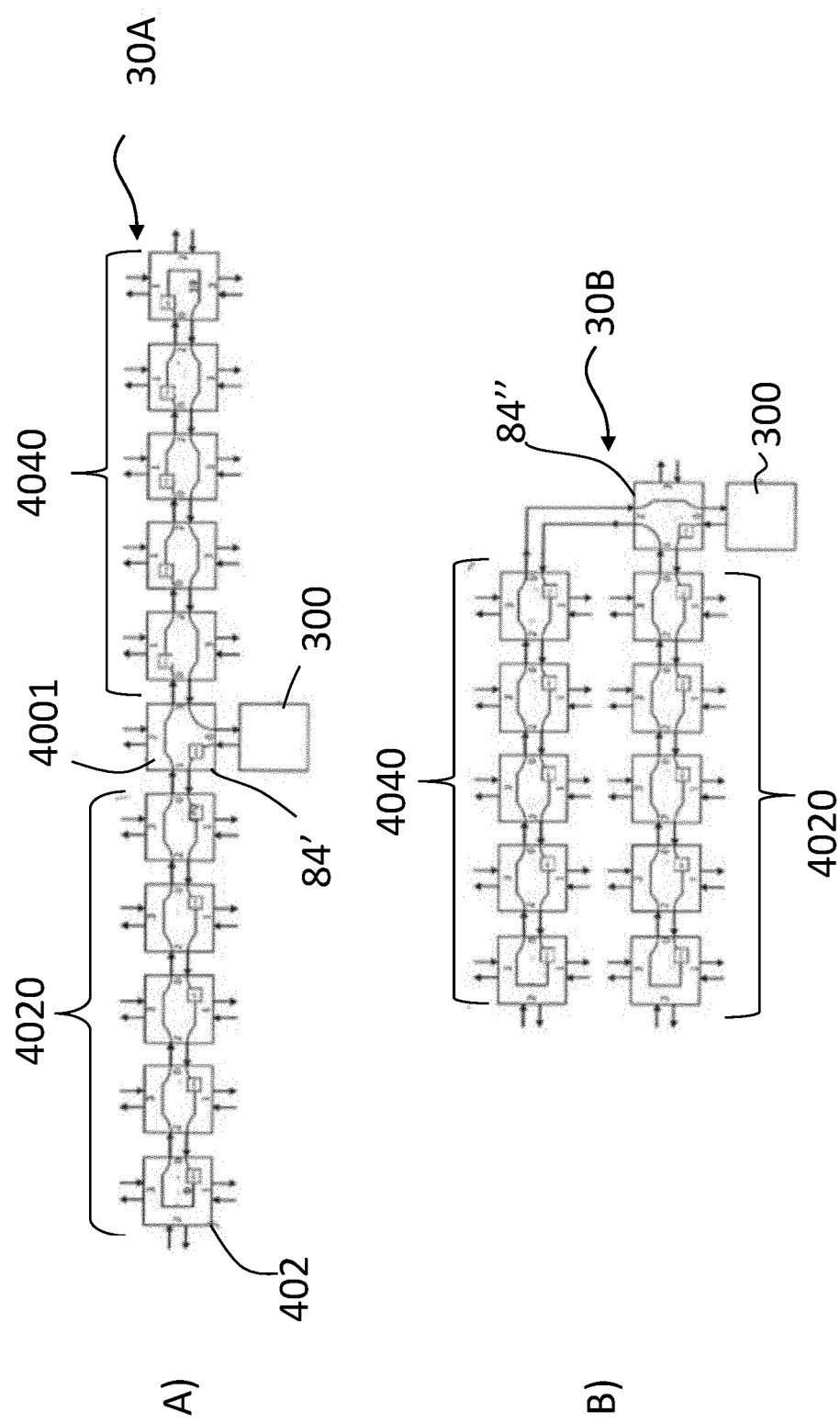

In one or more embodiments as exemplified in FIG. 14, a possible set of robotic modules or building blocks of a modular robot 10, 40, 40A, 40B as per the present disclosure, wherein each robotic module includes at least one of the integrated electronic slave devices with an embedded slave controller. For instance, the building blocks may comprise:
- a link robot module 12L, wherein the respective ports P0, P1, P2, P3 of a slave module 8013 associated to the link module 12L may be in an open-closed-open-closed sequence of respective states,
- a joint robot module 12J, wherein the respective ports P0, P1, P2, P3 of a slave module 8013 associated as well to the joint robot module 12J may be in an open-closed-open-closed sequence of respective states,
- a base robot module 11 having a master module 300 associated thereto,
- a set of end-effector modules 12E wherein the respective ports P0, P1, P2, P3 of a slave module 8014 associated to the end-effector module 12E may be in an open-closed-closed-closed sequence of respective states,
- hub module 12H having four different respective configurations of the slave modules 84. A hub module 12H can for example have only port P0, connected, P0+one other port, P0+two other ports or all ports connected. An end-effector module can only have P0 connected;
- a twin-hub 18 having an associated respective sequence of slave modules 8018.

Every one robot 10, 40, 40A, 40B has exactly one master module, controlling the communication module providing a command interface to the user.

End-Effector Modules 12E can only be placed as the ends of a chain. For them essentially the upstream port 0 is in use and all other ports are closed. End-Effector modules can have arbitrary application related purposes such as sensor modules, gripper and tools modules, or mobility modules such as feet or wheels for various types of locomotion.

Hub modules 12 allow to branch the network and therefore also the robot's kinematic chain. They have at least port P0 open. Port P1 to P3 can be opened or closed in arbitrary combinations. There can be Multi-Hubs 18, which essentially combine at least two slave controllers in a single robot module. For example, a twin-hub 18 would be a multi-hub with two slave controllers.

Multi-hubs facilitate to combine a higher number of branches. In one or more embodiments, a hub or a multi-hub may be integrated directly into with a master into the same housing.

Figure 12:
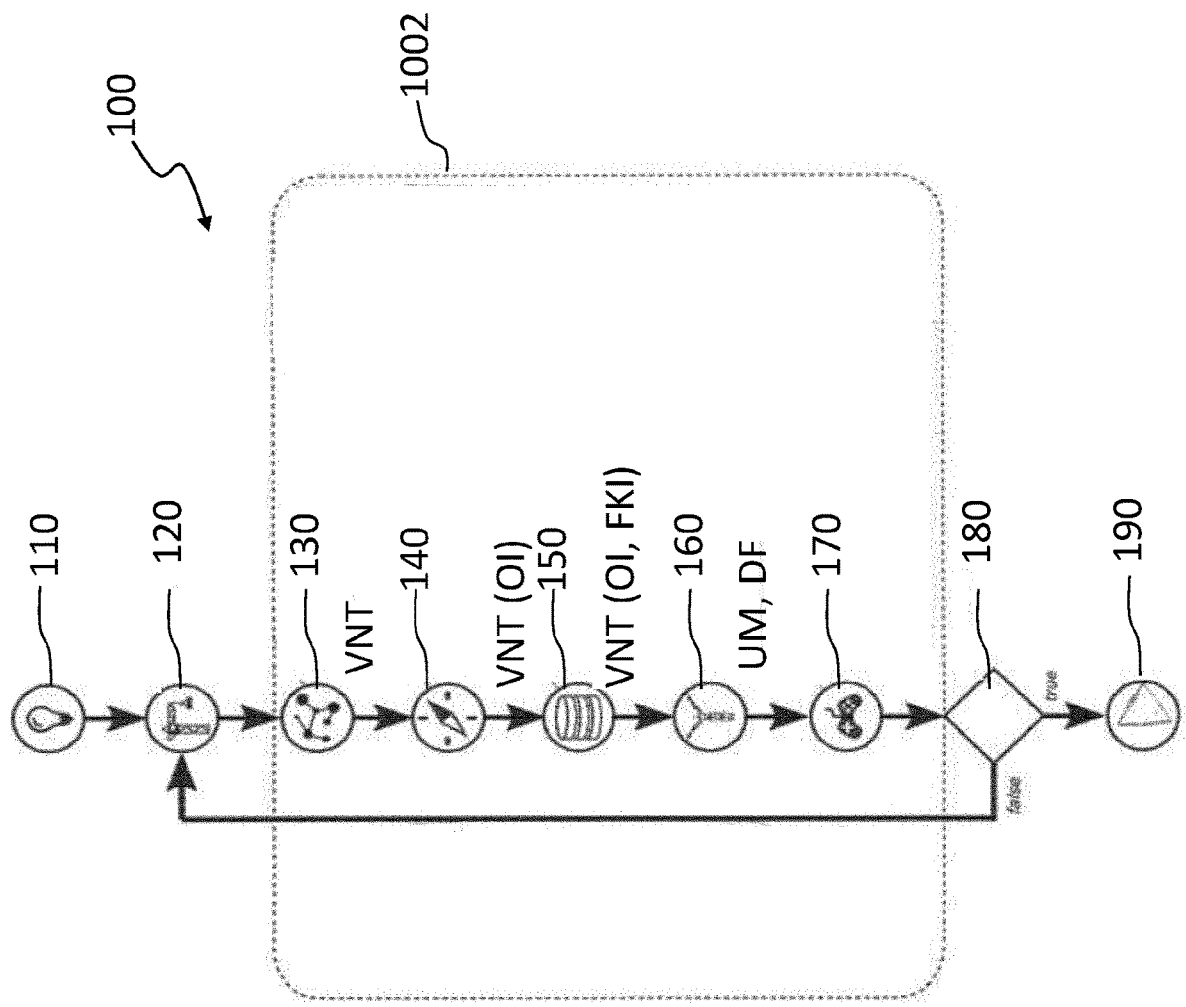
FIG. 12 is an exemplary diagram of a method as per the present disclosure.

In FIG. 12 it shown a flow diagram representing an embodiment of a method 100 of configuring modular configurable robot 10 like the one described so far. The method 100 may comprise:
- an initialization stage 110, wherein a modular robot 10 is provided and an automation task for the robot is defined,
- a robot assembly stage 120, comprising operations of mounting and/or dismounting modules of the modular robot, wherein a user may assemble a new module on the robot or removes an existing module from the robot,
- an automatic reconfiguration stage 1002, whose execution may be configured to be triggered either via periodic trigger, to check whether there are changes to the robot, or manually, for instance by the user through a software push-button, the automatic reconfiguration stage 1002
- a user interaction stage 180, wherein a user may provide an input to select whether to iterate operations of the automatic reconfiguration stage 1002,
- a final stage in which, for instance after each iteration 1002, the robot and its controllers are fully ready for operation.

As exemplified in FIG. 10, the automatic reconfiguration stage 1002 may comprise:
- a virtual network topology detection operation 130 comprising accessing by said master network communication module 300 said respective port state values stored in said slave module memory register 81 of said network communication slave modules 84 in said ring or chain network and computing at said master network communication module 300 a graph structure VNT, having the slave modules 84 as nodes and the connection among their ports as edges of said graph structure VNT, representative of a virtual topology of the communication network 30 of the assembled configurable robot 10 as a function of said respective port state values;
- a relative orientation detection operation 140, comprising acquiring such information OI of a relative orientation of the coupling of said robot module, e.g. the upstream module $12_1$, with respect to the adjacent module $12_2$ and associating such information OI of a relative orientation to the respective nodes 84 in said graph structure VNT, a configuration retrieval operation (150) comprising retrieving from said centralized module database or lookup table 9), as a function of said unique identification code I stored in said accessed slave module register 81 corresponding records containing robot module parameters FKI, e.g. functional, kinematic and inertial and semantic parameters, wherein the operation of providing the module database and retrieving the information therefrom facilitates reducing built-in data storage in the robot modules, a topology reconstruction operation 160 comprising generating an updated robot description file FD including updated robot kinematics and dynamics model UM, as a function of said graph structure VNT representative of the detected virtual topology in step 130, including said information OI of a relative orientation and said robot module parameters FKI, a controller configuration stage 170, comprising operations of configuring robot module controllers, e.g. controller modules 52, as well as the user interface, for instance on-the-fly.

In one or more embodiments, the automatic procedure 100 may be iterated until a user satisfaction level is reached.

Operations of topology 130 and relative orientation 140 detection, together with database retrieval 150, topology reconstruction 160 and reconfiguration 170 are performed at the master module 300 which controls the electronic (slave) devices 80 integrated into individual modules 12 of the modular robot 10.

As mentioned, the integrated electronic (slave) device 80 comprised in robot modules 12 is configured to establish a communication network between a master communication module 300 and at least one slave communication module 84.

In one or more embodiments as exemplified herein, the robot assembly stage 120 may comprise assembling, for instance mounting and dismounting, a robot module 12 of the modular robot 10.

For instance, any user can assemble 120 a custom robot 10, e.g., module by module thanks to EMI 100 which facilitate quick combination/coupling of modules one to the other, using low effort and time.

In one or more embodiments, adjusting, for instance comfortably and safely, a current posture of an assembled robot 10, it can be put into:

a) gravity compensation, so that the modular robot may either keep the pose to which the user has guided it kinesthetically, or b) zero effort mode, being effortless and compensate solely for joint internal friction forces.

As a result of the robot assembly stage 120, the robot structure 10 may comprise either an additional slave robot module 12 or have one slave robot module 12 moved or removed.

As a result of the removal/addition of a single slave robot module 12, the fully automated on-the-fly cycle 1002 may be triggered.

In one or more embodiments as exemplified herein, the automatic detection stage 130 may comprise a network topology discovery method, as a function of the integrated electronic slave device 84 providing the network communication interfaces.

In one or more embodiments as exemplified herein, an electronic slave device 84 as per the present disclosure may be configured to facilitate operating a chained network topology 30, for instance comprising chaining of slaves $84_1$, $84_2$, $84_3$ ..., $84_p$ to create line structures as well as branching to build tree structures.

In one or more embodiments as exemplified in FIG. 11, a (re)configurable modular robot 40A, 40B, 40C may comprise:

a robot "body" base module 400, having a plurality of coupling nodes 4000, 4002, and a plurality of robot modules 402, 404 configured to be coupled to coupling nodes 4000, 4002 in the base module 400 of the robot.

Figure 13:
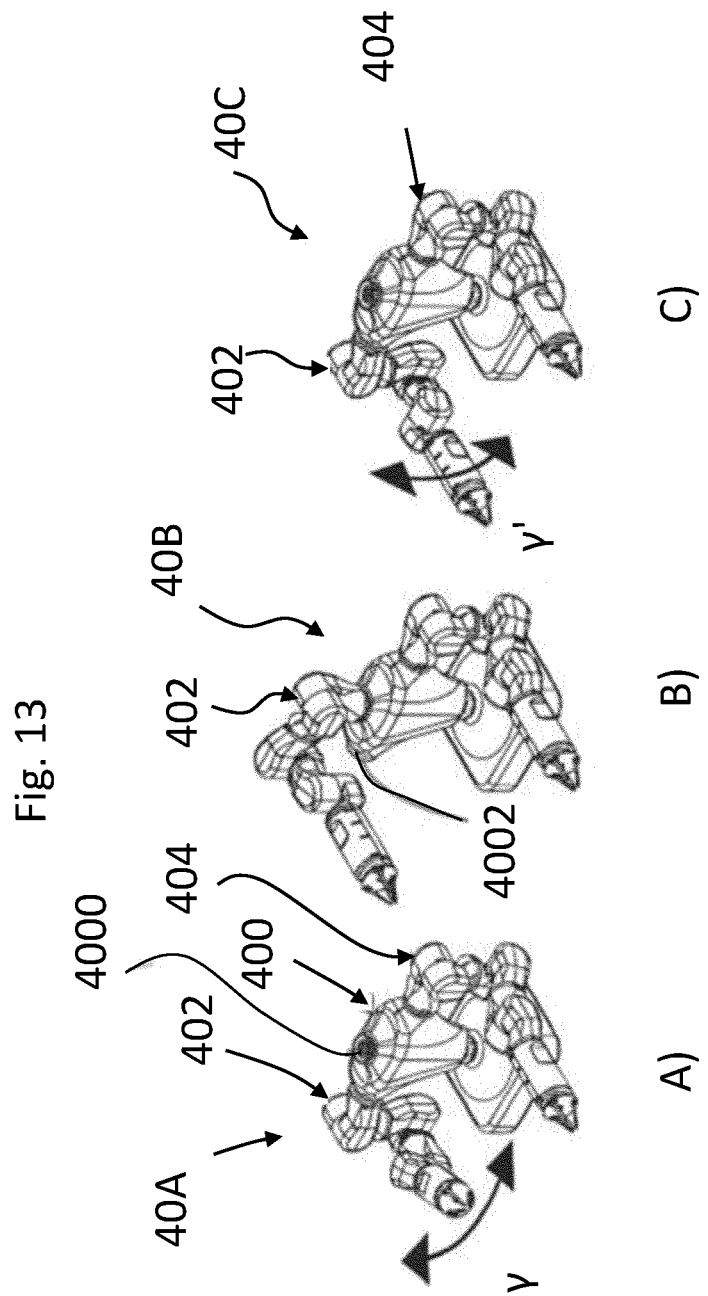
FIG. 13 is an exemplary diagram of possible robot configurations as per the present disclosure, FIG. 14, comprising portion a) and b), is an exemplary diagram of apparent topologies as per the present disclosure.

As exemplified in portion a) of FIG. 13, a first modular robot configuration 40A may comprise a first "arm" robot module 402, for instance a robotic arm configured to oscillate on an oscillation axis γ, wherein the first module 402 is coupled to a first coupling node 4002 in the module base 400.

As exemplified in portion b) of FIG. 13, a second modular robot configuration 40B may comprise the first module 402 coupled to a second coupling node 4000 in the module base 400.

In one or more embodiments, the base module 400 may comprise the control module device 300 coupled to a respective base slave device 84', 84" while the first 402 and second modules 404 may comprise respective chained sets of slave devices 4020, 4040, for instance wherein slave devices 84 in each set of slave devices 4020, 4040 are configured to be coupled to joints of the respective robot module 402, 404, as discussed in the following.

For instance, as exemplified in FIG. 14:

when the robot is in the first modular robot configuration 40A, the respective chains of slave devices used to control the first and second robot modules 402, 404 coupled to the base module 400 may have a first network topology 30A as exemplified in portion a) of FIG. 14 and/or when the robot is in the second modular robot configuration 40B, the respective chains of slave devices used to control the first and second robot modules 402, 404 coupled to the base module 400 may have a second network topology 30B as exemplified in portion b) of FIG. 14.

The first and second topologies 30A, 30B differ one with respect to the other mainly in that:

in the first network topology 30A, the base slave device 84' has ports configured so that they are all open except the second port P1, in the second network topology 30B, the base slave device 84" has ports configured so that they are all open except the third port P2.

It is noted that such first and second network topologies 30A, 30B while being "virtually"/"apparently" different in the configuration of the ports of a single slave device 84', 84", still the EtherCAT "actual"/"physical" network topology remains invariably an open ring, wherein the master 300 detects the presence of sets of chained slave devices coupled between them to form a line-up in a certain order on this ring.

Inventors have observed that the organization of the ports P0, P1, P2, P3 inside the EtherCAT Slave Controllers 84 in the network 30 make the "apparent" network topology 30A, 30B—and thereby the robot physical topology 40A, 40B—appear like a bus, tree-shaped or star-shaped topology, facilitating using two different apparent network 30A, 30B (physical robot) topologies with a same "actual" network topology 30.

In one or more embodiments, exploiting such a property of the "actual" network topology to reflect the topology of the physical robot, the automatic detection stage 130 configured for detecting the network communication topology of the robot modules assembled in the robot assembly stage 120 may comprise automatically reconstructing the apparent network topology as a function of the ordered sequence of the (sets of) slave devices as seen by the master controller 300 along the network ring 30, 30A, 30B.

Specifically, detecting/reconstructing 130 the apparent network topology 30A, 30B may comprise (virtually) looping over all slave devices forming the network ring.

As mentioned, each controller device 80 in the network 30 may have a "parent" (slave) device, a precursor on the network ring, but not necessarily the direct neighbor of the slave, for instance in a tree-like apparent network topology 30, 30A, 30B.

For instance, while looping over the ring 30 the controller 80 may assign an index to each slave, for instance following arrows anti-clockwise, the index being indicative of a slave device position along the network 30, 30A, 30B, and may check which ports are open in (slave) devices 80, for instance reading the respective state register, in order to determine its parent.

An algorithm as discussed in document "Simple Open EtherCAT Master" (https://openethercatsoci ety.github.io/) is suitable for use in detecting/reconstructing 130 the apparent network topology 30A, 30B.

In one or more embodiments, the automatic detection stage 130 may provide as an output a graph structure indicative of the apparent network topology 30A, 30B, wherein slave devices are modeled as graph nodes while respective port-connections are modeled as graph edges.

In one or more embodiments, it may be useful to be able to detect also a relative orientation between coupled robot modules, for instance the direction of an axis of movement γ of one module 402 with respect to other modules 400, 404.

For instance, as exemplified in Figure C) of FIG. 13, a user may assemble robot modules 400, 402, 404 in a third robot configuration 40C, comprising the first module 402 coupled to the first coupling node 4002 of the base module 400 and oriented by 90 degrees about the common normal axis between the module input and the module output interface of the precursor module, as indicated by axis γ' being tilted of 90° with respect to axis γ.

A conventional approach may envisage the use of two similar but distinct types of "arm" robot modules 402, each robot modules having its own unique module ID and therefore different sets of kinematic and dynamic parameters.

Conversely, in one or more embodiments as per the present disclosure, the same physical "arm" robot module 402 may be used to function according to this further axis alignment γ' using a simple reconfiguration of the ports P0, P1, P2, P3 of the respective set of slave devices 4020 comprised in the first module 402.

Inventors have observed that such an approach facilitates reducing the number of robot modules to provide a same assembly.

In one or more embodiments as per the present disclosure, an operation of detecting a relative orientation detection stage 140 may facilitate automatic on-the-fly recognition of the relative module mounting orientation, for instance in order to detect whether the user has assembled a first 40A or a second 40C robot configuration.

In order to facilitate such an orientation recognition, as mentioned, the EMI 100 for a respective module 402 may comprise a redundant set of rotary symmetric electromechanical connections 6711, facilitating detecting different relative orientations of the modules one with respect to another as a function of the orientation of the connection between male and female EMI portions 57, 67, coupling respective modules therebetween.

Specifically, relative orientation may be detected as a function of the input port in the set of input ports 722 of the microcontroller 72 of the integrated circuit 80 which received a value different from the default value.

Subsequently, the master module 300 may receive the retrieved orientation information in order to facilitate reconstructing the robot physical topology from the network topology 30, 30A, 30B. For instance, the nodes of the graph may be annotated with the relative mounting orientation information, providing a further processed graph.

In one or more embodiments as per the present disclosure, the configuration retrieval stage 150, may comprise:
  providing a centralized database 90 or repository, comprising information regarding configurable robot modules "valid" configurations, specifically records containing robot module parameters, in particular said records being accessible using as key the identification code I,
  retrieving from slave devices 80 in the network 30, e.g. starting from the first device 80' in the sequential network 30A, at least one identification code I, for instance representing a type and version identifier, wherein the at least one identification code I may be stored in the non-volatile memory 720 of the microprocessor system 72 of the integrated slave electronic control module 80,
  using the retrieved identification code I as a key to query the master database 90 and retrieve or lookup module properties of the module 402 from the centralized database or lookup table.

In one or more embodiments, providing the centralized database or lookup table 90 may comprise providing a database wherein properties stored, and accessible as a function of module type and version, or in general by the identification code I, comprise records comprising one or more of the following functional, kinematic and inertial parameters FKI:
  coordinate transformations between the coordinate frames assigned to the robot module 12,
  inertial parameters of the robot module 12, including center of mass coordinates with respect to an upstream frame, a module mass along with the module inertia parameters with respect to the center of mass.
  a set of module state parameters
  parameters for possible kinematic, differential or dynamic constraints, which can be conceivably realized with the module. In one or more embodiments, parameters for possible kinematic, differential or dynamic constraints may comprise mathematically formulated constraints as linear or quadratic matrix inequalities for the module state parameters. For instance, a rolling or slipping constraint equation is an example may be a constraint suitable for a wheel as a mobility module 17. In another example, motion range, torque or speed limits may be constraints suitable for robot joint modules 18. In one or more embodiments, the database may comprise reference to one or more equations defining the feasible constraint as a function of the module states along with the kinematic (distances) and dynamic (masses, inertias, forces, dampenings, stiffnesses, etc.) parameters to be used as values into the respective constraint equation(s).
  links to a mesh file graphically representing the module body.

semantic information describing the common purpose of the module, which identifies for example an end-effector module as a 'gripper' or a 'foot' or a 'wheel'.

Preferably, said record of the database 90 include at least coordinate transformations, inertial parameters, a set of module state parameters, parameters for kinematic, differential or dynamic constraints, links to a mesh file graphically representing the module body, semantic information describing the common purpose of the module.

In one or more embodiments, in the case of arm-like robot modules 10A, parameters relative to the upstream body, i.e. joint $12_1$, and the downstream body, i.e. joint $12_2$, may be stored separately.

Providing a centralized module database 90 configured to store robot configuration parameters may offer several advantages with respect to a distributed storage of these parameters within embedded system memory, the advantages comprising, for instance:

reducing data stored on the embedded module hardware, which may be limited in storage memory, facilitating a quicker reconfiguration and reduced network load thanks to the reduced the amount of data to be collected from each module on-the-fly, reducing system failure risks due to module parameter sets being out of synchronization, facilitating updating or adding information in one single memory space.

As a result of retrieving information from the database, the graph VNT received from the relative orientation detection stage 130 may be further processed, wherein graph nodes may be further annotated with the module identifiers as well as the functional, kinematic and inertial parameters FKI of the robot module.

In one or more embodiments, the topology reconstruction stage 160 may comprise recursively traversing the graph VNT created and annotated in the previous steps.

For instance, data stored in the graph structure VNT in (central) memory may be aggregated and structured into a robot description file DF in a standardized robot description format which can be exchanged among different software programs, so that the information can be further processed and used in conjunction with other software modules for kinematic and dynamic computations and control.

In one or more embodiments, the topology reconstruction stage 160 may comprise:

generating a kinematic model UM to be introduced in the robot description file DF by looking at the kinematic parameters collected for each node of the processed graph VNT. For instance, the edges of the network topology graph are translated into spatial transforms between the respective slave ports, wherein the spatial transforms are then written to a file using a tree-structured format, which also reflects the tree-like kinematic structure of the robot. For instance, the spatial transforms are complemented by a link to the mesh file visually representing the module and tags associating the semantic module information.

adding the inertial parameters and limits for each module to the robot description file FD, wherein the limits added are possible kinematic, differential or dynamic constraints, which can be conceivably realized with the module, wherein the result of this step is at least one file with a tree-like data format reflecting the robot physical tree-structure and describing the visual and mathematic model of the robot's kinematics and dynamics.

In one or more embodiments, kinematic, dynamic, visual and limit may be provided and processed in an XML-based Universal Robot Description Format (briefly, URDF).

In one or more embodiments, an URDF file may be generated on-the-fly 160 when a new module is added or removed, specifically a tree-formatted XML file describing the physical robot topology.

In one or more embodiments, the topology reconstruction stage 160 may comprise generating a second file in the Semantic Robot Description Format (briefly, SRDF) to assign the semantic information from the module data base to individual modules or groups of modules.

For instance, these files may be useful to communicate, reconfigure and initialize different modeling, control and user interaction plug-ins, software modules and services implementing the control and user interaction of the robot.

Advantageously, using established file-formats may facilitate interoperability of the robots assembled with the method 100 described here below together with software packages, e.g., for Robot Operating System (briefly, ROS) and libraries for kinematics and dynamics computation and higher-level control.

The controller configuration stage 170 includes operations of configuring robot module controllers, e.g. controller modules 52, as well as the user interface, for instance on-the-fly. In this step, the software modules are automatically reconfigured to adapt to the new robot topology and varied robot capabilities. In order to make reconfigurable robots actually useful and to leverage the flexibility offered by the hardware reconfigurability feature, the software reconfigures at the same time-scale as the electromechanical hardware modules are changed. In order to have a sustainable design and the implementation of such a software architecture, dependably managing the interaction and the coordination of both, the reconfigurable hardware and control modules, reusing the same controllers with any robot configured from the modules, the method here described realizes this based on a three layered software architecture.

Figure 15:
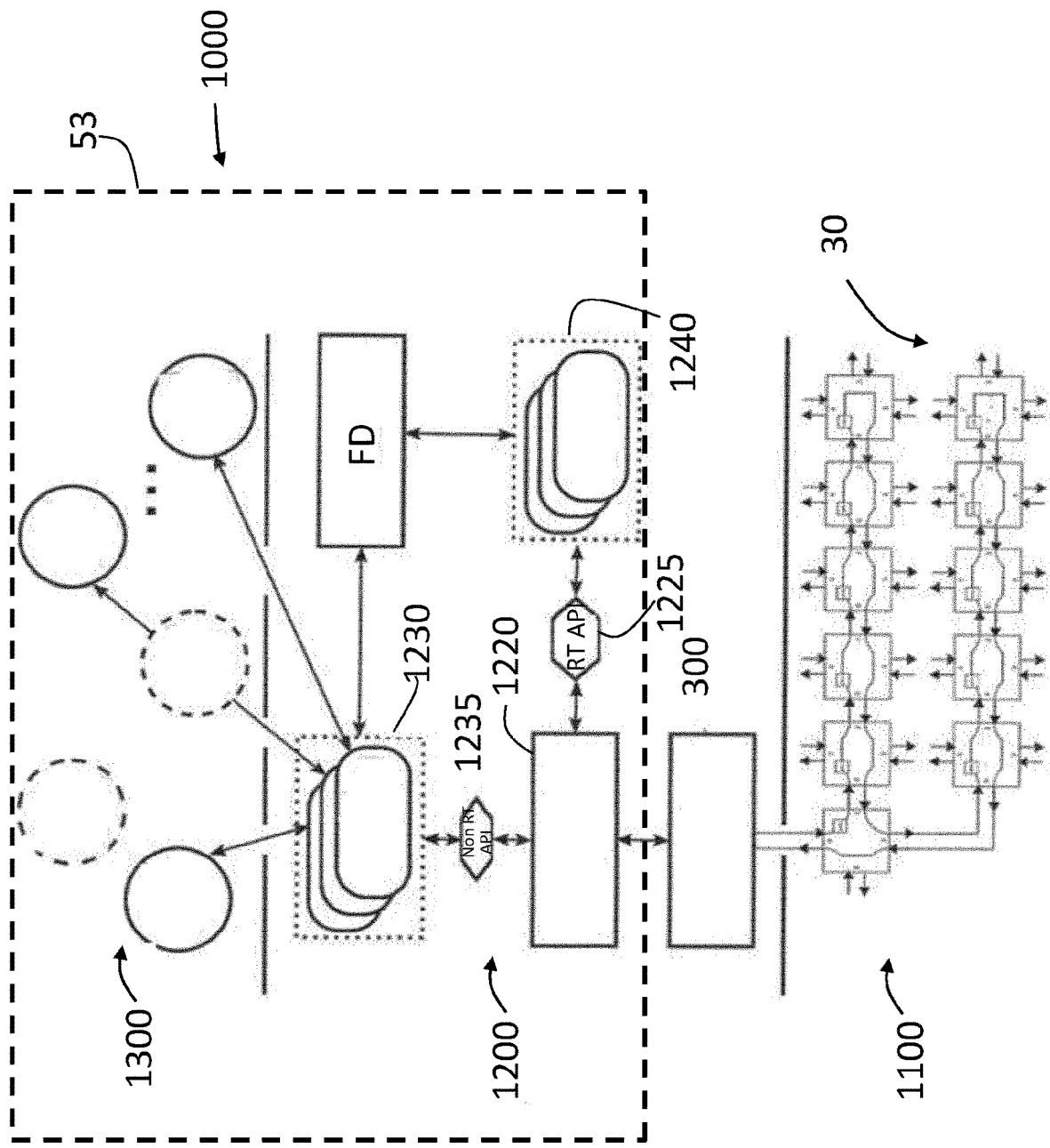
FIG. 15 is an exemplary diagram of a software architecture as per the present disclosure, FIG. 16, comprising portions a) to f), is exemplary of building blocks of a configurable robot as per the present disclosure.

As exemplified in FIG. 15, a multi-layered software architecture 1000 (e.g., comprising three layers), which may be implemented in the master robot module 11 by a control logic module, indicated by 53, or set of control logic modules, e.g., processor equipped modules associated to the master communication module 300, or, in variant embodiments, by the master communication module 300 itself integrating also the robot control functions, is disclosed.

Preliminarily it is specified that the robot 10 may have a centralized control, with which is intended that the controller at the master module 11, when determining the input (torque/force) to each joint, takes into account measurements and/or models related to the other joints of the robot 10. In general, a centralized controller requires knowledge, at least a partial one, of the mathematical model of the robot 10. Then, modules 12 may have also decentralized controllers: in a control chain starting with an instruction stack, which defines a target state, that passes through a stage of corresponding trajectory generation, which output is then applied to an inverse kinematics stage, generating the specific commands for the axis, supplied to an axis controller, such axis controller is intended as the lowest level part or decentralized controller of the robot control system, directly interacting with the robot internal sensors and actuators.

Under this view, the multi-layered software architecture 1000 may comprise:

a first "low" layer 1100, comprising the decentralized embedded software stored in the controller 52 memory in each and every robot module forming the configurable robot 10, i.e. the controllers connected by the communication network 30, wherein such a decentralized software level realizes the principal module functionality along with a software interface for centralized inputs and data exchange over the communication network, i.e command references from the centralized controller;

a second "middle" layer 1200, for instance a reconfigurable middleware level with hardware abstraction, coupled to the first "lowest" layer via the communication network (EtherCAT) master 300 which facilitates bi-directional communication between centralized software modules and the decentralized embedded software modules inside the hardware robot modules, i.e. controllers 52, a third "high" layer 1300, for instance a reconfigurable application level, which may be coupled to the second "middle" layer 1200 via one or more communication handler 1220 class objects configured to organize the communication between the second and the third layers.

For instance, in the exemplary case of robot joint modules, the first layer 1100 may comprise a decentralized actuator control with the interface to provide joint state measurements to the higher architecture level, as well as centralized control references from the higher architecture level.

In one or more embodiments, reconfigurability of the first software layer 1100 may derive from the decentralized nature and the connection to the communication network through the integrated electronic slave device.

In one or more embodiments, the reconfigurable software middleware with hardware abstraction layer of the second layer 1200 may facilitate ensuring cross-module interoperability exploiting the on-the-fly generated robot description files.

For instance, the middleware in the layer 1200 may facilitate centralized control and satisfy hard Real-Time (RT) requirements (i.e. perform computation within predictable timing constraints) for high frequency control loops (e.g. 1 kHz for entire robot platforms with multiple tens of modules) assuring Plug & Play robot control right after the (un-)mounting a new module without any further software intervention by the user, in order to facilitate soft human-robot interaction and kinaesthetic teaching/instruction by expert and also non-expert robot users.

In one or more embodiments, the middle layer 1200 may use a plug-in concept, facilitating to expand the reconfigurable robot capabilities by loading and unloading frequently used but also newly emerging software modules at run-time.

For instance, the plug-in concept is organized and managed by a plug-in handler 1220, which may be a real-time thread responsible to start loaded plug-ins 1240, e.g. all the basic and safety critical centralized controllers, execute them sequentially and close them safely before unloading. The plug-in handler 1220 is in communication with the plug-ins 1240 through a real time API 1225.

A plug-in itself can for example be a class derived from an abstract plugin-base-class defining the plugin interface comprehending an init routine for initializing variables, a run routine to execute the plugin and a close routine to safely shut down the plugin.

An XBotCore Cross-Robot Software Platform with Xenomai as real-time operating system (RTOS) is preferably used in the second layer 1200. XBotCore may feature native compatibility EtherCAT real-time communication towards the decentralized software architecture level with the Robot Operating System (ROS) for the non-real-time application software level.

In one or more embodiments, the third level 1300 may comprise a non-real-time (non-RT) application software level, wherein software modules in this layer may be configured to run in non-real-time threads which asynchronously receive data from the middle layer 1200, and send command references thereto.

Application programs running on the third layer 1300 may also share information among each other.

As the application software programs can run and terminate at arbitrary moments in time and interact with the underlying architecture levels 1200, 100, through requests, through a non-real-time application programming interface 1235, to a communication handler 1230 in the underlying middleware architecture level 1200, such a software layer may be easily reconfigurable.

The communication handler 1230 and the plug-ins 1240 are in communication exchange with the robot description FD, e.g. a URDF and a SRDF file, generated at step 160, Each software architecture level 1100, 1200, 1300 can run on different computer hardware and linked to the adjacent level through an Ethernet communication network.

For inverse kinematics and instantaneous control of the robots, the preferred implementation of the invented method uses the open OpenSOT software-package in combination with CartesIO for facilitated cost function and constraint assembly.

Always with reference to operation 170, coming to the step of controller reconfiguration, preferably, all basic and safety critical centralized controllers such as interaction, force and impedance controllers run as real-time plug-ins inside this middleware architecture level 1200. The controllers take into account the robot dynamics limits and remain stable even if the robot physical topology changes.

To provide a reconfigurable control architecture of the robot a passivity-based control frame and quadratic programming may be exploited.

In this approach, for instance:
the lowest level controllers on each module are passivity based decentralized joint torque controllers,
automation tasks for the robot are mathematically described as convex quadratic programs formulated as cost-functions to minimize under linear constraints.

This approach facilitates global minimizers of such optimization problems which are fast and efficient, with expedite convergence.

For example, if it is considered instantaneous control, it can be considered the weighted least square cost function $J(x)$:

$$J(x) = \|Ax - b\|_W^2,$$

where:
A is a matrix,
b a column vector,
W a weighting matrix, and
x a state vector of the robot.

For a generic task, columns of the matrix A correspond to a respective degree-of-freedom (DOF) of the modular robotic structure 10, while rows of the matrix A correspond to the number of degrees of freedom of the task (i.e. a task direction to control).

For example, for a Cartesian positioning task, the rows correspond to the six Cartesian position and orientation DOF.

Such DOF of the task and such column vector b remain constant even if modules 12 are added to or removed from the robot structure 10, while adding/removing modules 12 to the structure 10 will change the length of the robot state vector x and therefore the number of columns of matrix A.

For a robot, which is redundant for the task, the matrix A has more columns than rows.

For a task, which the robot 10 can only fulfill in a submanifold of the task space, the matrix A may have fewer rows than columns.

If the task has as many DOF as the robot 10, the matrix A is square (such as, for instance, for any joint space task).

Constraints are defined by a generic function. As an example, a simple constraint may take the form of a linear inequality constraint:

$$l \leq Cx \leq u,$$

where:
column vectors l and u are lower and upper bounds,
the matrix C is a constraint matrix.

Once again, columns of the matrix C correspond to DOF of the robotic structure, while rows correspond to constraint.

Considering that different modules might carry different constraints with respect to the task, adding/removing modules might introduce or relax (remove) constraints to the task. Consequently, adding or removing a robot DOF by adding/removing a module changes the size of C, as well as the size of vectors l and u as a function of the change in the number of constraints being active to the task.

Automation tasks T are atomic entities, which can be executed concurrently with equal or different priorities.

Priorities can be hard or soft priorities. Soft priorities are assigned to "equally important" tasks by the weighted superposition of their individual cost functions.

Concurrent tasks might be added as rows to the existing cost function.

Hard priorities are assigned by minimizing cost functions of lower priority tasks subject to the preserved optimality of higher priority tasks using null-space projection techniques, equality constraints or similar methods.

Controller reconfiguration may be performed by adding/removing rows in the matrix equations of cost-functions and constraint equations.

In one or more embodiments, the method may comprise automatically composing mathematical formulation by assembling the matrices and vectors forming the states and parameters of the cost function as well as the constraints based on the automatically discovered physical robot topology 130.

As a result, joint space dynamics of any assembled robot to be automatically calculated in the form:

$$B(q)\ddot{q} + h(q,\dot{q}) = \bar{\tau} + J^T(q)f_x,$$

where:
B(q) denotes the joint space inertia matrix,
h(q, q̇) is the vector of bias torques required to render zero joint acceleration, comprising vectors of gravitational and gyroscopic torques,
J(a)J(a) is the task Jacobian matrix relating joint-space velocities to task-space velocities,
$f_x f_x$ is a vector indicative of an external wrench applied to the robot,
τ̄ is an effort vector, which may be expressed as.

$$\bar{\tau} = [0^T, \tau^T]^T + \begin{bmatrix} J_{C,u}^T(q) \\ J_{C,\tau}^T(q) \end{bmatrix} f_C,$$

where the vector τ holds the torques generated by the joint modules.

Solving the above equation may facilitate to realize the zero effort and gravitation compensation control modes required during robot assembly 120 of the invented method.

If mobile robots with a so-called floating base are assembled from the modules, a zero vector 0 is attributed to the respective unactuated DOF of this floating base.

For a fixed base robot, rows corresponding to these DOF are dropped by a software flag.

A contact wrench $f_C$ holds the individual contact wrenches of all contact points.

A composite contact Jacobians $J_C(q)$ relate these wrenches to efforts acting on the robot joints. The matrix $J_{C,u}(q)J_{C,u}(q)$ attributes to the efforts $\bar{\tau}_{C,u}$ on the unactuated floating base degrees of freedom and the matrix $J_{C,\tau}(q)$ to the effortson the actuated joint degrees of freedom. Controllers for tasks the robot is meant to perform can thus be automatically generated as a cascade of convex quadratic programs of the form:

$$\min_{\tau_i} \|A_i \bar{\tau}_i - b_i\|^2 + \epsilon \|\bar{\tau}_i\|^2$$

$$\text{s.t.} b_l \leq C \bar{\tau}_i \leq b_u,$$

$$u_l \leq \bar{\tau}_i \leq u_u,$$

$$A_{i-1} \bar{\tau}_{i-1}^* = A_{i-1} \bar{\tau}_i$$

$$\vdots$$

$$A_1 \bar{\tau}_1^* = A_1 \bar{\tau}_i,$$

with $A_i = J_i(q)B^{-1}(q)$ and $b_i = \Lambda_i^{-1} f_i$, where $\Lambda(q) = (J(q)B^{-1}(q)J^T(q))^{-1}\Lambda(q) = (J(q)B^{-1}(q)J^T(q))^{-1}$ is the so-called task-space inertia matrix and ϵ is a constant regularization parameter. The values of i indicate the hard priority levels.

The required support forces to render the desired behaviour for the robot can then subsequently be found in another quadratic program cascade level by minimizing:

$$\min_{f_C} \|J_{C,u}^T(q) f_C - \bar{\tau}_{C,u}\|^2$$

$$\text{s.t.} b_l \leq C f_C \leq b_u,$$

$$u_l \leq f_C \leq u_u.$$

With this formulation it is possible to automatically generate mixed stiff and compliant tasks as well as hybrid trajectory tracking and force control tasks with priority enforcement among them.

For instance, once the user selects a type of task from a prepared task library and specify the reference frame as well as the respective task frame, default priorities can be altered interactively through a handheld user interface.

For instance, a simple example is a Cartesian impedance control task, in which the task frame being a gripper frame expressed in a robot base frame, which would react with respect to external force wrenches in certain directions as a virtual spring:

$$f_x = K_x(x_r - x) + D_x(\dot{x}_r - \dot{x}) + f_r,$$

with desired Cartesian stiffness $K_x$ and damping $D_x$, while tracking a motion specified by $x_r$ and $\dot{x}_r$ in the same directions as well as compatible desired reference forces $f_r f_r$ in other directions. All parameters to set up this control scheme are given in the robot description file and the user is not involved to provide additional tuning.

The result of this step is an updated formulation and configuration of the control problem for the combination of tasks specified by the user. This comprehends superimposed cost functions and constraints of the appropriately updated dimensions. The control problem is automatically complemented by adequate cost terms to avoid null-space drift in the case of task redundancy (more columns than rows in matrix A), and warnings are issued to the user when the desired task can only be fulfilled in submanifolds (overconstrained tasks, too few DOF, more rows than columns in matrix A). Errors are given as feedback, if the task defined by the user has become infeasible by the addition or removal of the module.

End-effector task-frames can be automatically shifted to new end-effector locations. The task formulation with respect to the end-effector remains identical; only numeric dimensions of the optimization problem are updated automatically.

Based on the description above, the advantages of the solution here described are clear.

The solution here described by integrating force/torque sensing capabilities into the devices forming the modules enables the implementation of soft and dependable physical interaction controllers that permit the user—who is not a robotics expert or programmer—to kinaesthetically instruct the robot for any desired task. Soft physical human-robot collaboration which enables kinaesthetic teaching and instruction by expert and also non-expert robot users is a very relevant aspect. Performing instead a simple and frequent reconfiguration of the robot would have little benefit, if instructing the robot thereafter requires a robotic programming expert and a large amount of time.

Further advantages of one or more embodiments comprise:
  facilitating robot modules selective maintenance,
  facilitating quick robot module hardware reconfiguration,
  facilitating quick adaptation of robot configuration to varying tasks,
  a process expert can set up the automation task even without robotic expertise,
  a user can design the exact robot for current application requirements without the need to create any mathematical model or controller,
  the user can design multiple copies of the same robot following the application requirements without the need to create any mathematical model or controller, The solution described also may facilitate supporting the user to assess the operation limits. For instance, the user can replace individual robot modules for maintenance, wherein system down-time amounts to only a few minutes.

The solution described may exploit network implementation facilitating to connect electronic (slave) devices in apparent topologies that are bus, tree- or star-shaped, which in the context of robotic modules may result in robots with series kinematic chains as well as tree-like kinematics.

The solution described advantageously provides a centralized data base, facilitating reducing memory space usage in local robot controllers.

The solution described may facilitate automated on-the-fly discovery of the network topology and the derivation of the physical topology of the robot therefrom.

Such a topology may facilitate designing, for instance:
  modular serial kinematic robots, such as robotic arms;
  tree-like robots, such as legged locomotion platforms.

The solution described may advantageously avoid using additional sensors or identification experiments to complete the robot model and topology description.

In one or more embodiments, a software level may be reconfigured as the electromechanical hardware modules are changed.

One or more embodiments may facilitate providing a software architecture having sustainable design, dependably managing the interaction and the coordination of both reconfigurable hardware and control modules.

One or more embodiments may facilitate, advantageously, reusing same controllers with any robot configured from the modules. In one or more embodiments, a user may avoid updating the control task of a robot due to a new module being added.

It is underlined additionally that the controller configuration stage 170 comprising reconfiguring the software of the controllers 52 of said updated robot kinematics and dynamics model UM, providing a configured robot to a user as a result may represent a per se relevant aspect of the solution here described. Such configuration stage 170 may be used in a method of configuring a modular configurable robot where the robot description may not be provided by a method including the steps 110-160, for instance is provided otherwise, e.g. by a user.

This also refers to the controller configuration stage 170 including that said software is configured according to an architecture 1000 comprising
  a first low layer 1100, comprising decentralized embedded software stored in the controller 52 memory in each and every robot module 12 forming the configurable robot 10, said decentralized software level being in particular configured to perform the principal module functionality along with a software interface for centralized inputs and data exchange over the communication network;
  a second middle layer 1200, coupled to the first "lowest" layer via the communication network, in particular EtherCAT, master 300, configured to operate in real time, in particular performing computation within predictable timing constraints, allowing bi-directional communication between centralized software modules in the master module (300) and the decentralized embedded software modules inside the hardware robot modules 52,
  a third high layer 1300 configured to run non real time applications by non-real-time threads, which asynchronically receive data from the second middle layer (1200) and send command references to it.

This also refers to the controller configuration stage 170 including to provide a reconfigurable control architecture of the robot, performing a passivity-based control frame and quadratic programming including:
  modeling the lowest level controllers 52 on each module as passivity based decentralized joint torque controllers,
  describing automation tasks for the robot as convex quadratic programs formulated as cost-functions $J(x)$ to minimize under linear constraints
  minimizing said cost-functions subject to a joint space dynamics equation of the assembled robot.

This also refers to describing automation tasks includes defining the cost function as a function of a matrix A of cost-functions having for column and rows the respective degree-of-freedom (DOF) of the modular robotic structure 10 and the number of degrees of freedom of the task performing controller reconfiguration by adding or removing rows in the matrix equations of cost-functions corresponding to the degree of freedom of the added or removed robot modules 12.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

The invention claimed is:

1. A modular configurable robot, comprising a set of robot modules, each robot module in the set of robot modules comprising:
   a coupling mechanism arranged to at least one end of said robot module configured for coupling with a corresponding coupling mechanism of an adjacent module to form an electromechanical interface, said coupling mechanism including a mechanical coupling member and an electrical coupling member, said electrical coupling member being configured to form an operative electrical connection with a corresponding electrical coupling member of said adjacent module upon coupling of the respective mechanical coupling members, said operative electrical connection comprising a network communication signal connection and a power supply connection, said electrical coupling member comprising an electric orientation signaling arrangement configured to form upon said coupling an orientation electrical signal which value depends on the relative orientation of the coupling of said robot module with respect to the adjacent module,
   at least one integrated circuit comprising:
   i) a microcontroller circuit portion comprising a non-volatile memory circuit portion configured to store a unique identification code of the robot module and at least one set of I/O ports coupled to said electrical coupling member to receive said orientation electrical signal, said microcontroller circuit portion being configured to obtain from said orientation electric signal an information on a relative orientation of the coupling of said robot module with respect to the adjacent module,
   ii) a communication network slave module comprising a set of communication ports and a slave module memory set of registers configured to store state values of said communication ports, the communication network slave module being coupled to the microcontroller circuit portion to exchange signals, wherein one of said communication ports is pre-designated as input communication port and wherein said ports of the set of communication ports are configured to be in either an open or closed state as a function of a respective port state value stored in said slave module memory set of registers,
   wherein said modular configurable robot further comprises a master robot module comprising a master network communication module coupled in signal exchange relationship to said communication network slave modules to form a master slave communication network topology, in particular a EtherCAT network,
   a server device configured to host a centralized robot module database or lookup table comprising a set of records containing robot module parameters, in particular functional, kinematic and inertial and semantic parameters, accessible by a respective unique identification code,
   said master network communication module being configured to access
   said communication network slave module to retrieve the respective unique identification code, and
   said centralized robot module database or lookup table to obtain a corresponding record containing robot module parameters, and
   said microcontroller circuit portion to retrieve said information of a relative orientation of the coupling of said robot module with respect to the adjacent module.

2. The modular configurable robot of claim 1, wherein said electrical coupling of said module is a male coupling comprising an arrangement of plug circuit elements and said electrical coupling of said adjacent module is a female coupling comprises an arrangement of socket ports, wherein at least one plug circuit element in the arrangement of plug circuit elements is configured to be selectively electrically coupled to at least one socket port in the arrangement of socket ports when said male electrical coupling is coupled to said female electrical coupling, said at least one set of I/O ports being couplable to at least one of said plug or socket arrangement of circuit elements of said at least one EMI.

3. The modular configurable robot of claim 2, wherein said plug arrangement of circuit elements of said male electrical coupling comprises a set of electric impedances, and
   wherein said at least one arrangement of socket ports is configured to electrically couple to ground at least an electric impedance in said set of electric impedances when coupled to said female electrical coupling.

4. The modular configurable robot of claim 3, wherein said plug arrangement of circuit elements further comprises a set of interface connectors on a first surface of the male electrical coupling and a further connector configured to provide a set of signals at respective pins, said signals having in particular a default value, the further connector coupled to a second surface opposed to said first surface,
   wherein said set of electric impedances of the male electrical coupling each have a first terminal coupled to a respective pin of the further connector and a second terminal coupled to a respective interface connector of the interface connectors, and
   wherein said female electrical coupling is configured to electrically couple to ground one impedance elements in said set of impedance elements when coupled to said arrangement of socket ports, said at least one set of I/O ports of said integrated circuit being configured to be coupled to said further connector (and to receive therefrom an electric signal at a respective connector pin.

5. A method of configuring a modular configurable robot, the method comprising:
   an initialization operation comprising providing at least the modular configurable robot according to claim 1 and which is configured to perform a given automation task,
   an assembly operation comprising operations of coupling and/or uncoupling at least one robot module of the plurality of robot modules of said configurable robot, coupling or uncoupling therebetween said electromechanical interface, generating a ring or chain network in said plurality of robot modules between said master network communication module and said slave communication modules—in said master slave communication network topology, an automatic configuration stage comprising:
a) a virtual network topology detection operation comprising accessing by said master network communication module said respective port state values stored in said slave module memory set of registers of said slave communication modules in said ring or chain network and computing at said master network communication module a graph structure, having the slave modules as nodes and the connection among their ports as edges of said graph structure, representative of a virtual topology of the communication network of the assembled configurable robot as a function of said respective port state values;
b) a relative orientation detection stage comprising acquiring said information of a relative orientation of the coupling of said robot module with respect to the adjacent module and associating said information of a relative orientation to the respective nodes in said graph structure,
c) a configuration retrieval stage comprising retrieving from said centralized module database or lookup table, as a function of said unique identification code stored in said accessed slave module set of registers corresponding records containing robot module parameters,
a topology reconstruction stage comprising generating an update robot description file including an updated robot kinematics and dynamics model, as a function of said graph structure representative of the detected virtual topology including said information of a relative orientation and said robot module parameters.

6. The method of claim 5, further comprising a controller configuration stage comprising reconfiguring software of controllers of said updated robot kinematics and dynamics model, providing a configured robot to a user as a result.

7. The method of claim 5, further comprising a user interaction stage wherein a user selects whether to iterate said stages of the automatic reconfiguration stage.

8. The method of claim 6, wherein said configuration retrieval stage comprises activating the master controller to, sequentially, perform operations of:
retrieving respective unique identification codes stored in said non-volatile memory circuit portion of the microcontroller circuit of the respective communication network slave module of respective robot modules of the assembled robot,
querying the master database as a function of said retrieved respective unique identification codes stored in said non-volatile memory circuit portion of the microcontroller circuit of the respective communication network slave module of respective robot modules of the assembled robot,
receiving said at least one set of module parameters among functional, kinematic, inertial and semantic parameters as a result of said query.

9. The method of claim 6, wherein said topology reconstruction stage comprises:
applying recursively traversing processing to said graph structure representative of the detected virtual topology which is computed and annotated,
generating a robot kinematic model as a function of said kinematic parameters collected for nodes of the processed graph structure, wherein edges of the graph structure representative of the detected virtual topology are translated into spatial transforms between the respective ports of the communication network slave modules, wherein the spatial transforms are then written to a file using a tree-structured format,
generating at least one mesh file representing the robot modules and at least one tag associating the semantic module information thereto,
aggregating and structuring into at least one tree-like data format standardized robot description, preferably an XML-based Universal Robot Description Format (briefly, URDF), and
aggregating and structuring further inertial parameters and limits to a further tree-like data format standardized robot description, wherein said limits comprise kinematic, differential or dynamic constraints, preferably using a Semantic Robot Description Format (briefly, SRDF).

10. The method of claim 6, wherein controller configuration stage includes that said software is configured according to an architecture comprising
a first low layer, comprising decentralized embedded software stored in a controller memory in each and every robot module forming the configurable robot, said decentralized software level being in particular configured to perform the principal module functionality along with a software interface for centralized inputs and data exchange over the communication network;
a second middle layer, coupled to the first "lowest" layer via the communication network, in particular EtherCAT, master, configured to operate in real time, in particular performing computation within predictable timing constraints, allowing bi-directional communication between centralized software modules in the master module and the decentralized embedded software modules inside the hardware robot modules,
a third high layer configured to run non real time applications by non-real-time threads, which asynchronically receive data from the second middle layer and send command references to it.

11. The method of claim 6, wherein the controller configuration stage includes, to provide a reconfigurable control architecture of the robot, performing a passivity-based control frame and quadratic programming including:
modeling the lowest level controllers on each module as passivity based decentralized joint torque controllers,
describing automation tasks for the robot as convex quadratic programs formulated as cost-functions to minimize under linear constraints
minimizing said cost-functions subject to a joint space dynamics equation of the assembled robot.

12. The method of claim 11, wherein describing automation tasks includes defining the cost function as a function of a matrix of cost-functions having for column and rows the respective degree-of-freedom of the modular robotic structure 10 and the number of degrees of freedom of the task performing controller reconfiguration by adding or removing rows in the matrix equations of cost-functions corresponding to the degree of freedom of the added or removed robot modules.

13. A computer program product loadable into a non-transitory memory of at least one processing circuit and configured to execute the method of claim 5 when run in said at least one processing circuit.

* * * * *